(12) United States Patent
Park et al.

(10) Patent No.: US 12,449,934 B2
(45) Date of Patent: Oct. 21, 2025

(54) ELECTRONIC DEVICE

(71) Applicant: Samsung Display Co., LTD., Yongin-si (KR)

(72) Inventors: Sanghun Park, Yongin-si (KR); Gwang-Bum Ko, Yongin-si (KR); Yongsub So, Yongin-si (KR); Kangwon Lee, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/936,708

(22) Filed: Nov. 4, 2024

(65) Prior Publication Data

US 2025/0208731 A1    Jun. 26, 2025

(30) Foreign Application Priority Data

Dec. 26, 2023  (KR) .......................... 10-2023-0191632

(51) Int. Cl.
*G06F 3/041* (2006.01)
*G06F 3/044* (2006.01)

(52) U.S. Cl.
CPC ...... *G06F 3/041662* (2019.05); *G06F 3/0412* (2013.01); *G06F 3/0446* (2019.05); *G06F 2203/04106* (2013.01)

(58) Field of Classification Search
CPC ............. G06F 3/041662; G06F 3/0446; G06F 3/0412; G06F 2203/04106
See application file for complete search history.

(56) References Cited

U.S. PATENT DOCUMENTS

| 11,928,280 B2 | 3/2024 | Choi et al. | |
| 2021/0072864 A1* | 3/2021 | Park | G06F 3/04166 |
| 2022/0334700 A1 | 10/2022 | Lim et al. | |
| 2023/0418412 A1* | 12/2023 | Kim | G06F 3/04166 |

FOREIGN PATENT DOCUMENTS

| KR | 10-2012-0078072 A | 7/2012 |
| KR | 10-2020-0143628 A | 12/2020 |
| KR | 10-2022-0143217 A | 10/2022 |
| KR | 10-2023-0016732 A | 2/2023 |

* cited by examiner

*Primary Examiner* — Peter D McLoone
(74) *Attorney, Agent, or Firm* — Womble Bond Dickinson (US) LLP

(57) ABSTRACT

An electronic device includes a sensor layer, and a sensor driver operating in a first mode for sensing a touch input or a second mode for sensing a pen input. The sensor layer includes a plurality of first electrodes, a plurality of second electrodes, a plurality of first trace lines connected to first end portions of the plurality of first electrodes, a plurality of second trace lines connected to the plurality of second electrodes, respectively, and a plurality of third trace lines connected to second end portions spaced apart in the second direction from the first end portions of the plurality of first electrodes. The plurality of third trace lines are isolated from each other in the first mode, the second mode includes a charging driving mode, and at least some of the plurality of third trace lines are connected to each other in the charging driving mode.

20 Claims, 25 Drawing Sheets

FIG. 16

| | 210t1 | 210t2 | 210t3 | 210t4 | 210t5 | 210t6 | 210t7 | 210t8 | 210t9 | 210t10 | 210t11 |
|---|---|---|---|---|---|---|---|---|---|---|---|
| t1 | SG1 | FL | SG2 | FL | FL | FL | FL | FL | FL | FL | FL |
| t2 | FL | SG1 | FL | SG2 | FL | FL | FL | FL | FL | FL | FL |
| t3 | FL | FL | SG1 | FL | SG2 | FL | FL | FL | FL | FL | FL |
| t4 | FL | FL | FL | SG1 | FL | SG2 | FL | FL | FL | FL | FL |
| t5 | FL | FL | FL | FL | SG1 | FL | SG2 | FL | FL | FL | FL |
| t6 | FL | FL | FL | FL | FL | SG1 | FL | SG2 | FL | FL | FL |
| t7 | FL | FL | FL | FL | FL | FL | SG1 | FL | SG2 | FL | FL |
| t8 | FL | FL | FL | FL | FL | FL | FL | SG1 | FL | SG2 | FL |
| t9 | FL | FL | FL | FL | FL | FL | FL | FL | SG1 | FL | SG2 |

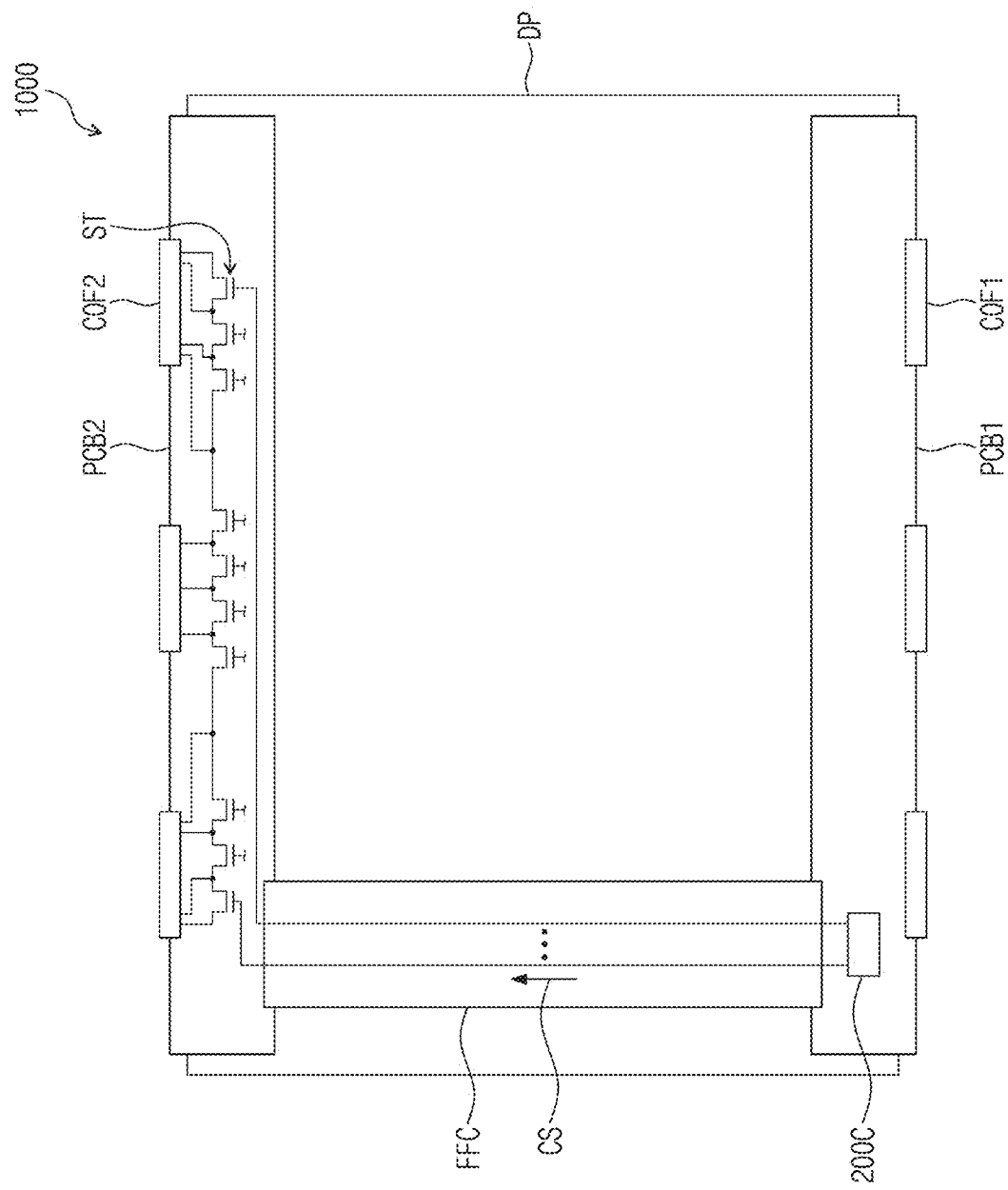

ELECTRONIC DEVICE

CROSS-REFERENCE TO RELATED APPLICATION

The present application claims priority to and the benefit of Korean Patent Application No. 10-2023-0191632, filed on Dec. 26, 2023, in the Korean Intellectual Property Office, the entire disclosure of which is incorporated herein by reference.

BACKGROUND

1. Field

Aspects of some embodiments of the present disclosure described herein relate to an electronic device for sensing an input made by a pen.

2. Description of the Related Art

Multimedia electronic devices, such as televisions (TVs), cellular phones, tablet computers, laptop computers, navigation devices, or game consoles, include a display device which displays images. Electronic devices may include a sensor layer (or an input sensor) that provides a touch-based input manner for enabling users to intuitively, conveniently, and easily input information or a command, in addition to a general input manner, such as a button, a keyboard, or a mouse. The sensor layer may sense a touch of a user or pressure made by the user. Meanwhile, the use of a stylus pen has been increasingly demanded for users familiar with inputting information using a write instrument, or for inputting a fine touch through a specific application program (e.g., a sketch or drawing).

The above information disclosed in this Background section is only for enhancement of understanding of the background and therefore the information discussed in this Background section does not necessarily constitute prior art.

SUMMARY

Aspects of some embodiments of the present disclosure include an electronic device capable of sensing an input made by a pen.

According to some embodiments of the present disclosure, an electronic device may include a display panel including a display layer and a sensor layer on the display layer, and a sensor driver to drive the sensor layer and to selectively operate in a first mode for sensing a touch input or a second mode for sensing a pen input. According to some embodiments, the sensor layer may include a plurality of first electrodes arranged in a first direction and extending in a second direction crossing the first direction, a plurality of second electrodes arranged in the second direction and extending in the first direction, a plurality of first trace lines electrically connected to first end portions of the plurality of first electrodes, a plurality of second trace lines electrically connected to the plurality of second electrodes, respectively, and a plurality of third trace lines electrically connected to second end portions spaced apart in the second direction from the first end portions of the plurality of first electrodes. According to some embodiments, the plurality of third trace lines may be electrically isolated from each other in the first mode, the second mode may include a charging driving mode, and at least some of the plurality of third trace lines may be electrically connected to each other in the charging driving mode.

According to some embodiments, the sensor driver may apply a first signal to at least one of the plurality of first trace lines, and to apply a second signal to at least a different one of the plurality of first trace lines, in the charging driving mode.

According to some embodiments, the second signal may have an inverse phase signal of the first signal.

According to some embodiments, the electronic device may further include a plurality of switching transistors, and each switching transistor may be electrically connected between two third trace lines, which are adjacent to each other, among the plurality of third trace lines.

According to some embodiments, the number of the plurality of switching transistors may be less than the number of the plurality of third trace lines.

According to some embodiments, the plurality of switching transistors may be turned off in the first mode.

According to some embodiments, at least a portion of the plurality of switching transistors may be turned on in the charging driving mode.

According to some embodiments, the electronic device may further include a first circuit film electrically connected to one end portion of the display panel, a second circuit film electrically connected to another end portion of the display panel, a first circuit board electrically connected to the display panel through the first circuit film, and a second circuit board electrically connected to the display panel through the second circuit film, the sensor driver may be mounted on the first circuit board, and the plurality of switching transistors may be included in the second circuit board.

According to some embodiments, the electronic device may further include a connection film connected to the first circuit board and the second circuit board, and the plurality of switching transistors may operate by the sensor driver.

According to some embodiments, the electronic device may further include an additional sensor driver mounted on the second circuit board, and an operation of the plurality of switching transistors may be controlled by the additional sensor driver.

According to some embodiments, the plurality of switching transistors may be included in the display layer.

According to some embodiments, the second mode may further include a pen sensing driving mode, and the sensor driver may receive an induced current from the plurality of first electrodes and the plurality of second electrodes.

According to some embodiments of the present disclosure, an electronic device may further include a sensor layer, and a sensor driver to drive the sensor layer and to selectively operate in a first mode for sensing a touch input or a second mode for sensing a pen input, and including a charging driving mode and a pen sensing driving mode. According to some embodiments, the sensor layer may include a plurality of first electrodes arranged in a first direction and extending in a second direction crossing the first direction, a plurality of second electrodes arranged in the second direction and extending in the first direction, a plurality of first trace lines electrically connected to first end portions of the plurality of first electrodes, a plurality of second trace lines electrically connected to the plurality of second electrodes, respectively, and a plurality of switching transistors electrically connected to second end portions spaced apart in the second direction from the first end portions of the plurality of first electrodes, and the plurality of switching transistors may be turned off in the first mode, and at least some of the plurality of switching transistors may be turned on in the charging driving mode.

According to some embodiments, the electronic device may further include a display layer under the sensor layer, and the plurality of switching transistors may be included in the display layer.

According to some embodiments, the electronic device may further include a first circuit film electrically connected to one end portion of the sensor layer, a second circuit film electrically connected to another end portion of the sensor layer, a first circuit board electrically connected to the sensor layer through the first circuit film, and a second circuit board electrically connected to the sensor layer through the second circuit film. According to some embodiments, the sensor driver may be mounted on the first circuit board, and the plurality of switching transistors may be included in the second circuit board.

According to some embodiments, the electronic device may further include a connection film connected to the first circuit board and the second circuit board, and the operation of the plurality of switching transistors may be controlled by the sensor driver.

According to some embodiments, the sensor layer may further include a plurality of third trace lines electrically connected to the second end portions of the plurality of first electrodes.

According to some embodiments, each of the plurality of switching transistors may be electrically connected between two third trace lines adjacent to each other among the plurality of third trace lines.

According to some embodiments, the number of the plurality of switching transistors may be less than the number of the plurality of third trace lines.

According to some embodiments of the present disclosure, an electronic device may include a sensor layer, and a sensor driver to drive the sensor layer and to selectively operate in a first mode for sensing a touch input or a second mode for sensing a pen input, and including a charging driving mode and a pen sensing driving mode, the sensor layer may include a plurality of first electrodes arranged in a first direction, and extending in a second direction crossing the first direction, a plurality of second electrodes arranged in the second direction and extending in the first direction, a plurality of first trace lines electrically connected to first end portions of the plurality of first electrodes, and a plurality of second trace lines electrically connected to the plurality of second electrodes, respectively, second end portions spaced apart in the second direction from the first end portions of the plurality of first electrodes may be floated in the first mode, at least some of the second end portions of the plurality of first electrodes may be connected to each other to define a current path in the charging driving mode, and the current path may include one first trace line among the plurality of first trace lines, one first electrode connected to the one first trace line among the plurality of first electrodes, another first electrode of the plurality of first electrodes, and another first trace line electrically connected to the another first electrode among the plurality of first trace lines.

BRIEF DESCRIPTION OF THE DRAWINGS

The above and other aspects and features of embodiments according to the present disclosure will become more apparent by describing in more detail aspects of some embodiments thereof with reference to the accompanying drawings.

FIG. 16 is a table illustrating signals provided to a sensor layer according to some embodiments of the present disclosure.

FIG. 18B is a plan view illustrating some components of an electronic device according to some embodiments of the present disclosure.

DETAILED DESCRIPTION

Figure 1:
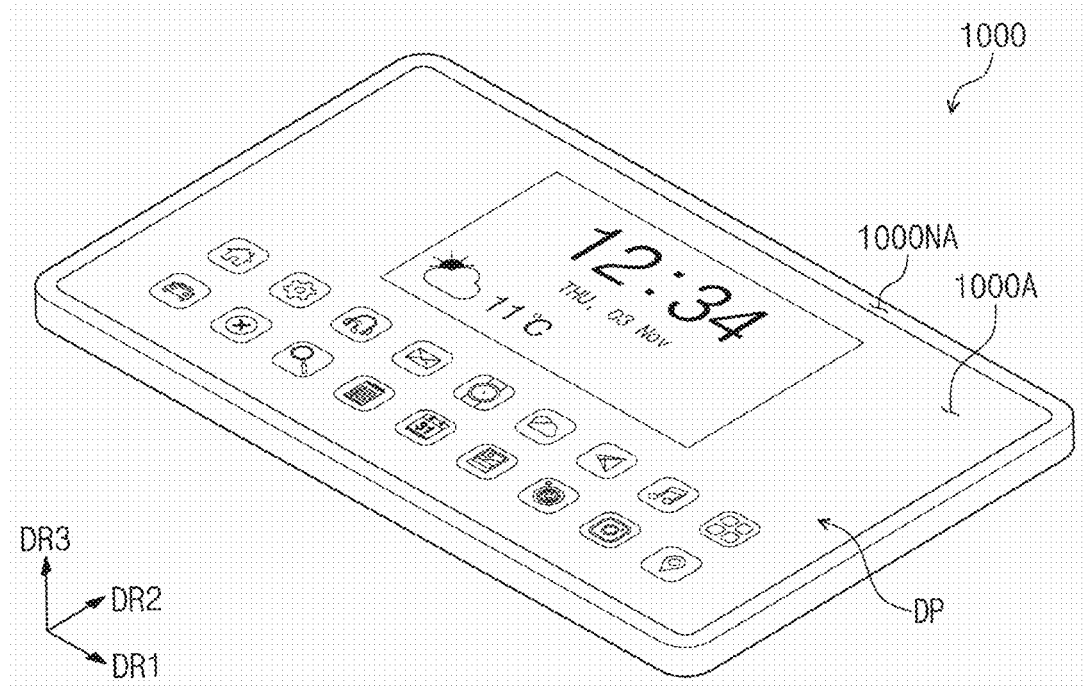
FIG. 1 is a perspective view of an electronic device according to some embodiments of the present disclosure.

In the specification, the expression that a first component (or region, layer, part, portion, etc.) is "on", "connected to", or "coupled to" a second component means that the first component is directly on, connected to, or coupled to the second component or means that a third component is interposed therebetween.

The same reference numeral will be assigned to the same component. In addition, in drawings, thicknesses, proportions, and dimensions of components may be exaggerated to describe the technical features effectively. The term "and/or" includes any and all combinations of one or more of associated components Although the terms "first", "second", etc. may be used to describe various components, the components should not be construed as being limited by the terms. The terms are only used to distinguish one component from another component. For example, without departing from the scope and spirit of the present disclosure, a first component may be referred to as a second component, and similarly, the second component may be referred to as the first component. The singular forms are intended to include the plural forms unless the context clearly indicates otherwise.

In addition, the terms "under", "at a lower portion", "above", "an upper portion" are used to describe the relationship between components illustrated in drawings. The terms are relative and are described with reference to a direction indicated in the drawing.

It will be further understood that the terms "comprises," "comprising", "includes", or "including," or "having" specify the presence of stated features, numbers, steps, operations, components, parts, or the combination thereof, but do not preclude the presence or addition of one or more other features, numbers, steps, operations, components, components, and/or the combination thereof.

Unless otherwise defined, all terms (including technical terms and scientific terms) used in the specification have the same meaning as commonly understood by one skilled in the art to which the present disclosure belongs. Furthermore, terms such as terms defined in the dictionaries commonly used should be interpreted as having a meaning consistent with the meaning in the context of the related technology, and should not be interpreted in ideal or overly formal meanings unless explicitly defined herein.

The terms "part" and "unit" refer to a software component or a hardware component to perform a specific function. The hardware component may include field-programmable gate array (FPGA) or an application-specific integrated circuit (ASIC). Software components may indicate data used by executable codes and/or executable codes in a storage medium which is able to be addressed. Accordingly, software components may be, for example, object-oriented software components, class components, and task components, and may include processes, functions, properties, procedures, subroutines, program code segments, driver data, firmware, microcodes, circuits, data, database, data structures, tables, arrangements or variables.

Hereinafter, aspects of some embodiments of the present disclosure will be described in more detail with reference to accompanying drawings.

Figure 2:
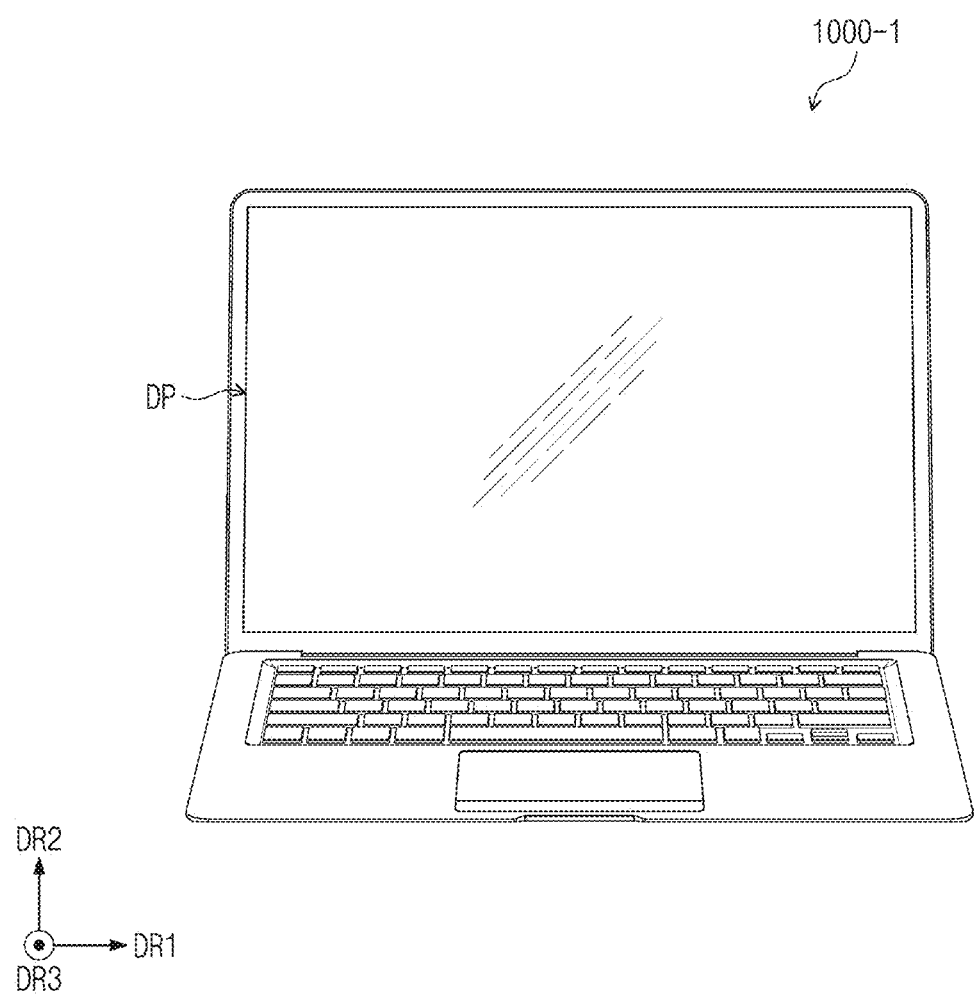
FIG. 2 is a perspective view illustrating an electronic device according to some embodiments of the present disclosure.

FIG. 1 is a perspective view of an electronic device 1000 according to some embodiments of the present disclosure. FIG. 2 is a perspective view illustrating further details of an electronic device 1000-1 according to some embodiments of the present disclosure.

Referring to FIGS. 1 and 2, the electronic device 1000 or 1000-1 is a device activated in response to an electrical signal. For example, the electronic device 1000 or 1000-1 may be a cellular phone, a foldable phone, a laptop computer, a television, a tablet, a vehicle navigation system, a game console, or a wearable device, but embodiments according to the present disclosure are not limited thereto. Although FIG. 1 illustrates the electronic device 1000 as a tablet, FIG. 2 illustrates the electronic device 1000-1 serving as a laptop computer, and embodiments according to the present disclosure are not limited thereto. Although FIG. 2 is the perspective view of an electronic device 1000-1, the coordinate axes included in FIG. 2 are displayed based on the display panel DP within the electronic device 1000-1.

The electronic device 1000 may include an active region 1000A and a peripheral region 1000NA (defined or formed) in the electronic device 1000. The electronic device 1000 may display images through the active region 1000A. The active region 1000A may include a surface defined by a first direction DR1 and a second direction DR2. The peripheral region 1000NA may surround the active region 1000A. According to some embodiments of the present disclosure, the peripheral region 1000NA may be omitted.

The thickness direction of the electronic device 1000 may be parallel to a third direction DR3 crossing the first direction DR1 and the second direction DR2. Accordingly, front surfaces (or top surfaces) and rear surfaces (or bottom surfaces) of members constituting the electronic device 1000 may be defined based on the third direction DR3.

The electronic device 1000 may include a display panel DP. The display panel DP may display an image and may sense an input applied from the outside. The external input may be a user input. The input of the user may include any one of various external inputs, such as a part of a physical body of the user, a pen, light, heat, or pressure, or the combination thereof.

Although FIG. 1 illustrates the electronic device 1000 in a bar type, embodiments according to the present disclosure are not limited thereto. For example, the following description will be applied to various electronic devices, such as a rollable-type electronic device, a slidable-type electronic device, a stretchable-type electronic device.

Figure 3:
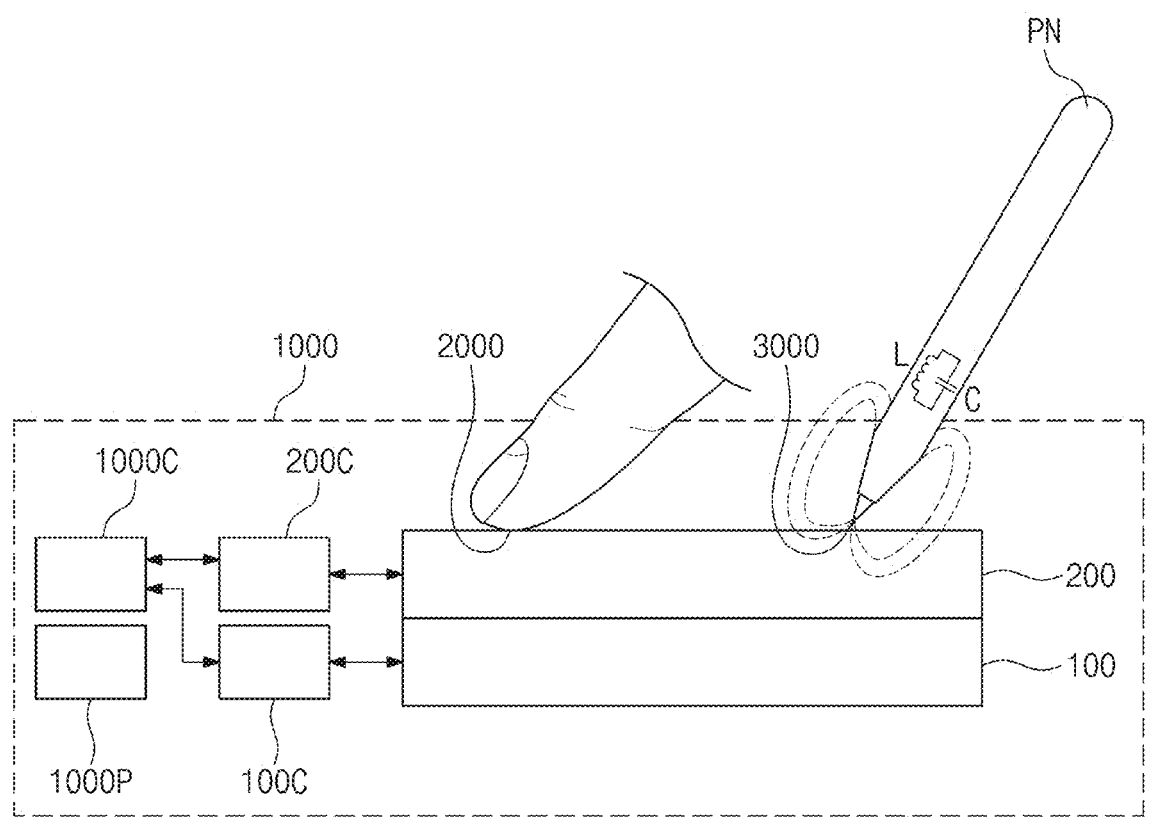
FIG. 3 is a view illustrating the operation of an electronic device according to some embodiments of the present disclosure.

FIG. 3 is a view illustrating the operation of the electronic device 1000, according to some embodiments of the present disclosure.

Referring to FIG. 3, the electronic device 1000 may include a display layer 100, a sensor layer 200, a display driver 100C, a sensor driver 200C, a main driver 1000C, and a power supply circuit 1000P.

The sensor layer 200 may sense a first input 2000 or a second input 3000 applied thereto from an outside. Each of the first input 2000 and the second input 3000 may be an input unit to make a change in capacitance of the sensor layer 200 or an input unit to induce an induced current to the sensor layer 200. For example, the first input 2000 may be a passive type input unit such as a user's body. The second input 3000 may be an input by the pen PN or an input by a radio frequency integrated circuit (RFIC) tag. For example, the pen PN may be a passive type pen or an active type pen.

According to some embodiments of the present disclosure, the pen PN may be a device to generate a magnetic field having a specific resonance frequency. The pen PN may be configured to transmit an output signal based on an electromagnetic resonance scheme. The pen PN may be referred to as an input device, an input pen, a magnetic pen, a stylus pen, or an electromagnetic resonance pen.

The pen PN may include an RLC resonance circuit, and the RLC resonance circuit may include an inductor L and a capacitor C. According to some embodiments of the present disclosure, the RLC resonance circuit may be a variable resonance circuit that varies a resonance frequency. In this case, the inductor L may be a variable inductor and/or the capacitor C may be a variable capacitor, but embodiments according to the present disclosure are not specifically limited thereto.

The inductor L generates a current by a magnetic field formed in the electronic device 1000, for example, the sensor layer 200. However, embodiments according to the present disclosure are not specifically limited thereto. For example, when the pen PN operates in an active type or active mode, the pen PN may generate a current even when the magnetic field is not provided from the outside. The generated current is transmitted to the capacitor C. The capacitor C charges the current received from the inductor L, and discharges the charged current to the inductor L. Thereafter, the inductor L may discharge a magnetic field having the resonance frequency. The induced current may flow through the sensor layer 200 by the magnetic field discharged from the pen PN, and the induced current may be transmitted to the sensor driver 200C while serving as a received signal (or a sensing signal, a signal).

The main driver 1000C may control an overall operation of the electronic device 1000. For example, the main driver 1000C may control the operations of the display driver 100C and the sensor driver 200C. The main driver 1000C may include at least one microprocessor, and may further include a graphic controller. The main driver 1000C may be referred to as an application processor, a central processing unit, or a main processor.

The display driver 100C may control the display layer 100. The display driver 100C may receive image data and a control signal from the main driver 1000C. The control signal may include various signals. For example, the control signal may include an input vertical synchronization signal, an input horizontal synchronization signal, a main clock, and a data enable signal.

The sensor driver 200C may control the sensor layer 200. The sensor driver 200C may receive a control signal from the main driver 1000C. The control signal may include a clock signal of the sensor driver 200C. In addition, the control signal may further include a mode determining signal for determining driving modes of the sensor driver 200C and the sensor layer 200.

The sensor driver 200C may be integrated in the form of an integrated circuit (IC) and may be electrically connected to the sensor layer 200. For example, the sensor driver 200C may be directly mounted on a specific region of the display panel or mounted through a chip on film (COF) scheme on a separate printed circuit board such that the sensor driver 200C may be electrically connected to the sensor layer 200.

The sensor driver 200C and the sensor layer 200 may alternatively operate in a first mode or a second mode. For example, the first mode may be a mode to sense a touch input, for example, the first input 2000. The second mode may be a mode to sense the input of the pen PN, for example, the second input 3000. The first mode may be referred to as a touch sensing mode, and the second mode may be referred to as a pen sensing mode.

The switching between the first mode and the second mode may be performed in various switching manners. For example, the sensor driver 200C and the sensor layer 200 may be time-divided into the first mode and the second mode to sense the first input 2000 and the second input 3000. Alternatively, the switching between the first mode and the second mode may be made by the selection of the user or a specific behavior (or input) of the user. Alternatively, any one of the first mode and the second mode may be activated or deactivated or switched to a remaining mode among the first mode and the second mode through the specification application activated or deactivated. Alternatively, the sensor driver 200C and the sensor layer 200 may be maintained in the first mode when sensing the first input 2000 or maintained in the second mode when sensing the second input 3000, while alternatively operating in the first mode and the second mode.

The sensor driver 200C may calculate information on coordinates of a input, based on a signal received from the sensor layer 200, and may provide a coordinate signal having the coordinate information to the main driver 1000C. The main driver 1000C executes an operation corresponding to the user input, in response to the coordinate signal. For example, the main driver 1000C may operate the display driver 100C such that a new application image is displayed on the display layer 100.

The power supply circuit 1000P may include a power management integrated circuit (PMIC). The power supply circuit 1000P may generate a plurality of driving voltages to drive the display layer 100, the sensor layer 200, the display driver 100C, and the sensor driver 200C. For example, the plurality of driving voltages may include a gate high voltage, a gate low voltage, a first driving voltage (e.g., the voltage of ELVSS), a second driving voltage (e.g., the voltage of ELVDD), or an initialization voltage.

Figure 4A:
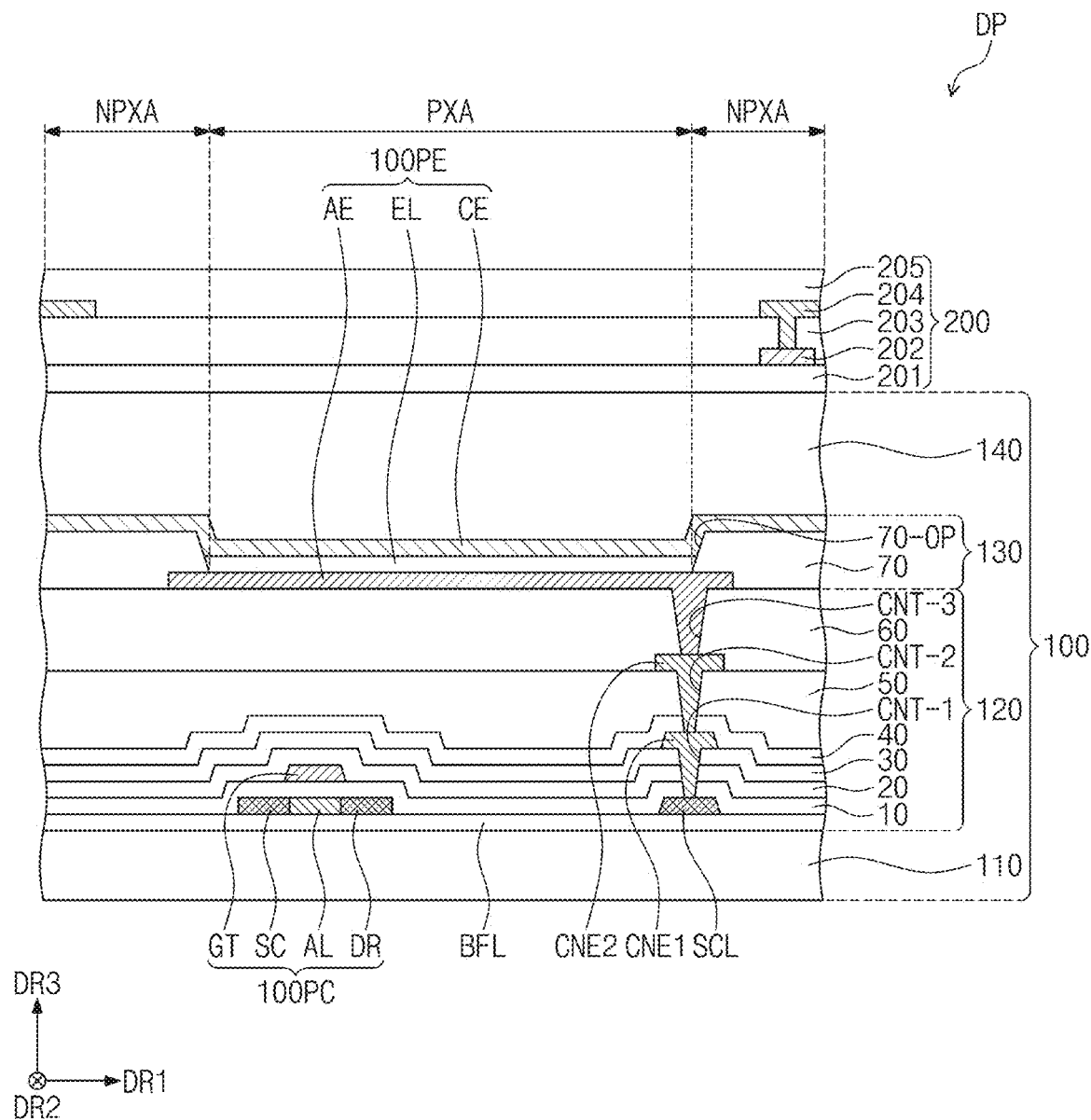
FIG. 4A is a cross-sectional view illustrating a display panel according to some embodiments of the present disclosure.

FIG. 4A is a cross-sectional view of the display panel DP, according to some embodiments of the present disclosure.

Referring to FIG. 4A, the display panel DP may include the display layer 100 and the sensor layer 200.

The display layer 100 may be a component which generates or displays images. The display layer 100 may be an emissive-type display layer. For example, the display layer 100 may be an organic light emitting display layer, an inorganic light emitting display layer, an organic-inorganic display layer, a quantum dot display layer, a micro-LED display layer, or a nano-LED display layer. The display layer 100 may include a base layer 110, a circuit layer 120, a light emitting element layer 130, and an encapsulating layer 140.

The base layer 110 may be a member which provides a base surface for disposing the circuit layer 120. The base layer 110 may have a multi-layer structure or a single layer structure. The base layer 110 may be a glass substrate, a metal substrate, a silicon substrate, or a polymer substrate, and embodiments according to the present disclosure are not limited thereto. The circuit layer 120 may be located on the base layer 110. The circuit layer 120 may include an insulating layer, a semiconductor pattern, a conductive pattern, and a signal line. An insulating layer, a semiconductor layer, and a conductive layer may be formed on the base layer 110 through a coating or deposition process. Thereafter, the insulating layer, the semiconductor layer, and the conductive layer may then be selectively patterned through multiple photolithography processes.

The light emitting element layer 130 may be located on the circuit layer 120. The light emitting element layer 130 may include a light emitting element. For example, the light emitting element layer 130 may include an organic light emitting material, an inorganic light emitting material, an organic-inorganic light emitting material, a quantum dot, a quantum rod, a micro-LED, or a nano-LED. The encapsulating layer 140 may be located on the light emitting element layer 130. The encapsulating layer 140 may protect the light emitting element layer 130 from foreign substances such as moisture, oxygen, and dust particles.

At least one buffer layer BFL is formed on a top surface of the base layer 110. The buffer layer BFL may relatively improve a bonding force between the base layer 110 and a semiconductor pattern. The buffer layer BFL may be formed in multiple layers. Alternatively, the display layer 100 may further include a barrier layer. The buffer layer BFL may include at least one of silicon oxide, silicon nitride, or silicon oxynitride. For example, the buffer layer BFL may include a structure in which a silicon oxide layer and a silicon nitride layer are alternately stacked.

Semiconductor patterns SC, AL, DR, and SCL may be located on the buffer layer BFL. The semiconductor patterns SC, AL, DR, and SCL may include polysilicon. However, embodiments according to the present disclosure are not limited thereto, and the semiconductor patterns SC, AL, DR, and SCL may include amorphous silicon, low-temperature polycrystalline silicon, or an oxide semiconductor.

FIG. 4A merely illustrates some of the semiconductor patterns SC, AL, DR, and SCL, and the semiconductor patterns are further arranged in other regions. The semiconductor patterns SC, AL, DR, and SCL may be arranged in a specific rule while crossing pixels. The semiconductor patterns SC, AL, DR, and SCL may have different electrical properties, depending on doping states. The semiconductor patterns SC, AL, DR, and SCL may include the first regions SC, DR, and SCL having higher conductivity and the second region AL having lower conductivity. The first regions SC, DR, and SCL may be doped with an N-type dopant or a P-type dopant. The P-type transistor may include a doping region doped with a P-type dopant, and the N-type transistor may include a doping region doped with an N-type dopant. The second region AL may be a non-doping region or a region doped at a lower concentration than the first regions SC, DR, and SCL.

The first regions SC, DR, and SCL may have conductivity higher than the conductivity of the second region AL, and may substantially serve as an electrode or a signal line. The second region AL may substantially correspond to an active region AL (or a channel) of a transistor 100PC. In other words, first portion (see reference numeral AL) among the semiconductor patterns SC, AL, DR, and SCL may be the active region AL of the transistor 100PC, and second portions (see reference numerals SC and DR) among the semiconductor patterns SC, AL, DR, and SCL may be the source region SC or the drain region DR of the transistor 100PC. A third portion (see reference numeral SCL) among the semiconductor patterns SC, AL, DR, and SCL may be a connected electrode or the connection signal line SCL.

Each of pixels may have an equivalent circuit including a plurality of transistors, at least one capacitor, and at least one light emitting element, and the equivalent circuit of the pixel may be modified in various forms. FIG. 4A illustrates that the pixel includes one transistor 100PC and one light emitting element 100PE, by way of example.

The source region SC, the active region AL, and the drain region DR of the transistor 100PC may be formed from the semiconductor patterns SC, AL, DR, and SCL. The source region SC and the drain region DR may extend in directions opposite to each other from the active region AL, when viewed in a cross-sectional view. FIG. 4A illustrates a portion of the connection signal line SCL formed from the semiconductor patterns SC, AL, DR, and SCL. According to some embodiments, the connection signal line SCL may be connected to the drain region DR of the transistor 100PC, when viewed in a plan view.

A first insulating layer 10 may be located on the buffer layer BFL. The first insulating layer 10 may commonly overlap a plurality of pixels and cover the semiconductor patterns SC, AL, DR, and SCL. The first insulating layer 10 may be an inorganic layer and/or an organic layer, and may have a single layer structure or a multi-layer structure. The first insulating layer 10 may include at least one of an aluminum oxide, a titanium oxide, a silicon oxide, a silicon nitride, a silicon oxynitride, a zirconium oxide, or a hafnium oxide. According to some embodiments, the first insulating layer 10 may be a silicon oxide layer in a single layer. The insulating layer of the circuit layer 120, which is to be described below, in addition to the first insulating layer 10, may be an inorganic layer and/or an organic layer, and may have a single layer structure or a multi-layer structure. The inorganic layer may include, but is not limited to, at least one of the above-described materials.

A gate GT of the transistor 100PC is located on the first insulating layer 10. The gate GT may be a portion of a metal pattern. The gate GT may be overlapped with the active region AL. In the process for doping or reducing the semiconductor patterns SC, AL, DR, and SCL, the gate GT may serve as a mask.

A second insulating layer 20 may be located on the first insulating layer 10 to cover the gate GT. The second insulating layer 20 may be overlapped with the pixels in common. The second insulating layer 20 may be an inorganic layer and/or an organic layer, and may have a single layer structure or a multi-layer structure. The second insulating layer 20 may include at least one of silicon oxide, silicon nitride, or silicon oxynitride. According to some embodiments, the second insulating layer 20 may have a multi-layer structure including a silicon oxide layer and a silicon nitride layer.

A third insulating layer 30 may be located on the second insulating layer 20. The third insulating layer 30 may have a single layer structure or a multi-layer structure. For example, the third insulating layer 30 may have a multi-layer structure including a silicon oxide layer and a silicon nitride layer.

A first connection electrode CNE1 may be located on the third insulating layer 30. The first connection electrode CNE1 may be connected to the connection signal line SCL through a contact hole CNT-1 formed through the first insulating layer 10, the second insulating layer 20, and the third insulating layer 30.

A fourth insulating layer 40 may be located on the third insulating layer 30. According to some embodiments, the fourth insulating layer 40 may be a silicon oxide layer in a single layer. A fifth insulating layer 50 may be located on the fourth insulating layer 40. The fifth insulating layer 50 may be an organic layer.

A second connection electrode CNE2 may be located on the fifth insulating layer 50. The second connection electrode CNE2 may be connected to the first connection electrode CNE1 through a contact hole CNT-2 formed through the fourth insulating layer 40, and the fifth insulating layer 50.

A sixth insulating layer 60 may be located on the fifth insulating layer 50 and may cover the second connection electrode CNE2. The sixth insulating layer 60 may be an organic layer.

The light emitting element layer 130 may be located on the circuit layer 120. The light emitting element layer 130 may include the light emitting element 100PE. For example, the light emitting element layer 130 may include an organic light emitting material, an inorganic light emitting material, an organic-inorganic light emitting material, a quantum dot, a quantum rod, a micro-LED, or a nano-LED. The following description will be described regarding the light emitting element 100PE which is an organic light emitting element, by way of example, but embodiments according to the present disclosure are not specifically limited thereto.

The light emitting element 100PE may include a first electrode AE, a light emitting layer EL, and a second electrode CE.

The first electrode AE may be located on the sixth insulating layer 60. The first electrode AE may be connected with the second connection electrode CNE2 through a contact hole CNT-3 formed through the sixth insulating layer 60.

A pixel defining layer 70 may be located on the sixth insulating layer 60 and may cover a portion of the first electrode AE. An opening 70-OP is defined in the pixel defining layer 70. The opening 70-OP of the pixel defining layer 70 exposes at least a portion of the first electrode AE.

The active region 1000A (see FIG. 1) may include a light emitting region PXA and a non-light emitting region NPXA adjacent to the light emitting region PXA. The non-light emitting region NPXA may surround the light emitting region PXA. According to some embodiments, the light emitting region PXA is defined to correspond to the portion of the first electrode AE, which is exposed by the opening 70-OP.

The light emitting layer EL may be located on the first electrode AE. The light emitting layer EL may be located in a region corresponding to the opening 70-OP. Although FIG. 4A illustrates that the light emitting layer EL is located in the opening 70-OP, embodiments according to the present disclosure are not limited thereto. For example, the light emitting layer EL may extend to cover a side surface of the pixel defining layer 70 defining the opening 70-OP and a portion of the top surface of the pixel defining layer 70.

According to some embodiments of the present disclosure, the light emitting layer EL may be separately formed in each of pixels. When the light emitting layer EL is separately formed in each pixel, each of light emitting layers EL may emit light of at least one of a blue color, a red color, or a green color. However, embodiments according to the present disclosure are not limited thereto, and the light emitting layer EL may be connected with the pixels and commonly provided in the pixels. In this case, the light emitting layer EL may provide blue light or white light.

The second electrode CE may be located on the light emitting layer EL. The second electrode CE may have an integral-type form, and may be arranged in the plurality of pixels in common.

According to some embodiments of the present disclosure, a hole control layer may be located in the first electrode AE and the light emitting layer EL. The hole control layer may be located in the light emitting region PXA and the non-light emitting region NPXA in common. The hole control layer may further include a hole transfer layer and a hole injection layer. An electron control layer may be interposed between the light emitting layer EL and the second electrode CE. The electron control layer may include an electron transfer layer and may further include an electron injection layer. The hole control layer and the electron control layer may be formed in the plurality of pixels in common by using an open mask or an ink-jet process.

The encapsulating layer 140 may be located on the light emitting element layer 130. The encapsulating layer 140 may include an inorganic layer, an organic layer, and an inorganic layer sequentially stacked, and layers constituting the encapsulating layer 140 are not limited thereto. The inorganic layers may protect the light emitting element layer 130 from moisture and oxygen, and the organic layer may protect the light emitting element layer 130 from a foreign material such as dust particles. The inorganic layers may include a silicon nitride layer, a silicon oxynitride layer, a silicon oxide layer, a titanium oxide layer, or an aluminum oxide layer. The organic layer may include an acrylic-based organic layer, but embodiments according to the present disclosure are not limited thereto.

The sensor layer 200 may include a base layer 201, a first conductive layer 202, an intermediate insulating layer 203, a second conductive layer 204, and a cover insulating layer 205.

The base layer 201 may be an inorganic layer including at least one of silicon nitride, silicon oxynitride, or silicon oxide. Alternatively, the base layer 201 may be an organic layer including an epoxy resin, an acrylic resin, or an imide-based resin. The base layer 201 may have a single layer structure or a multi-layer structure including layers stacked in the third direction DR3. According to some embodiments of the present disclosure, the sensor layer 200 may not include the base layer 201.

Each of the first conductive layer 202 and the second conductive layer 204 may have a single layer structure or a multi-layer structure including the layers stacked in the third direction DR3.

Each of the first conductive layer 202 and the second conductive layer 204 having a single layer structure may include a metal layer or a transparent conductive layer. The metal layer may include molybdenum, silver, titanium, copper, aluminum, or an alloy thereof. The transparent conductive layer may include a transparent conductive oxide such as indium tin oxide (ITO), indium zinc oxide (IZO), zinc oxide (ZnO), or indium zinc tin oxide (IZTO). In addition, the transparent conductive layer may include a conductive polymer such as poly (3,4-ethylenedioxythiophene) (PEDOT), metal nanowires, or graphene.

Each of the first conductive layer 202 and the second conductive layer 204 having a multi-layer structure may include metal layers. The metal layers may have, for example, a three-layer structure of titanium/aluminum/titanium. The conductive layer in the multi-layer structure may include at least one metal layer and at least one transparent conductive layer.

According to some embodiments of the present disclosure, the thickness of the first conductive layer 202 may be greater than or equal to the thickness of the second conductive layer 204. When the thickness of the first conductive layer 202 is greater than the thickness of the second conductive layer 204, the resistance of components (e.g., an electrode, a sensing pattern, or a bridge pattern) included in the first conductive layer 202 may be relatively reduced. In addition, because the first conductive layer 202 is located under the second conductive layer 204, even if the thickness of the first conductive layer 202 is increased, the probability that components included in the first conductive layer 202 are viewed by external light reflection, may be lower than that of the second conductive layer 204.

At least one of the intermediate insulating layer 203 or the cover insulating layer 205 may include an inorganic film. The inorganic film may include at least one of an aluminum oxide, a titanium oxide, a silicon oxide, a silicon nitride, a silicon oxynitride, a zirconium oxide, or a hafnium oxide.

At least one of the intermediate insulating layer 203 or the cover insulating layer 205 may include an organic film The organic film may include at least one of an acrylic resin, a methacryl resin, polyisoprene, a vinyl resin, an epoxy resin, a urethane resin, a cellulose resin, a siloxane resin, a polyimide resin, a polyamide resin, or a perylene resin.

Although the above-description has been made regarding that the total of two conductive layers of the first conductive layer 202 and the second conductive layer 204 are provided, embodiments according to the present disclosure are not limited thereto. For example, the sensor layer 200 may include at least three conductive layers.

Figure 4B:
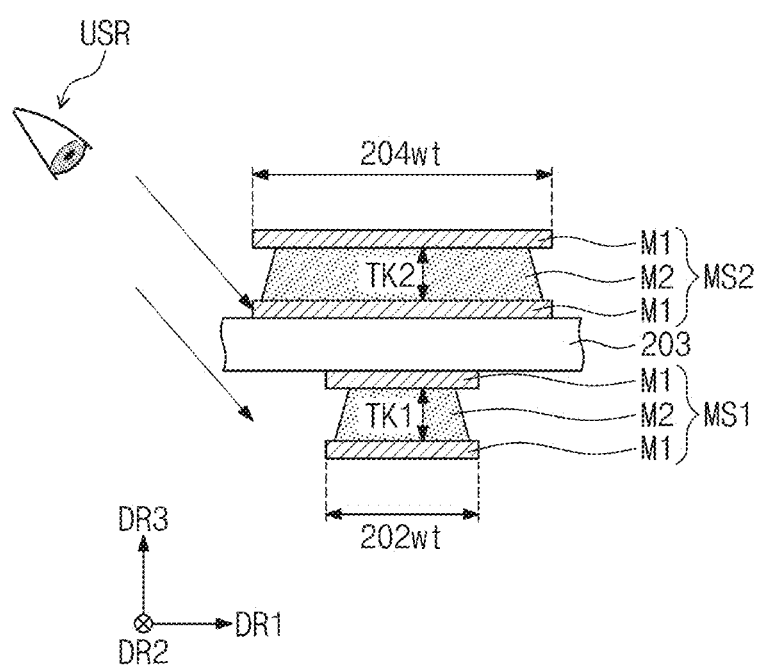
FIG. 4B is a cross-sectional view illustrating a sensor layer according to some embodiments of the present disclosure.

FIG. 4B is a cross-sectional view illustrating the sensor layer 200, according to some embodiments of the present disclosure.

Referring to FIGS. 4A and 4B, a second width 204wt of a second mesh line MS2 included in the second conductive layer 204 may be equal to or greater than a first width 202wt of a first mesh line MS1 included in the first conductive layer 202. When a user USR views the first mesh line MS1 and the second mesh line MS2 from the side, because the first mesh line MS1 has a smaller width than the second mesh line MS2, the probability that the first mesh line MS1 is viewed by the user USR may be relatively reduced.

Each of the first mesh line MS1 and the second mesh line MS2 may include first metal layers M1 and a second metal layer M2 interposed between the first metal layers M1. For example, the first metal layers M1 may include titanium (Ti), and the second metal layer M2 may include aluminum (Al). However, embodiments according to the present disclosure are not specifically limited thereto.

According to some embodiments of the present disclosure, a first thickness TK1 of the second metal layer M2 of the first mesh line MS1 may be equal (or substantially equal) to a second thickness TK2 of the second metal layer M2 of the second mesh line MS2, but embodiments according to the present disclosure are not specifically limited thereto. For example, the first thickness TK1 may be thicker than the second thickness TK2. Alternatively, the second thickness TK2 may be thicker than the first thickness TK1. According to some embodiments of the present disclosure, each of the first thickness TK1 and the second thickness TK2 may be 1000 angstroms or more, for example, 6000 angstroms.

Figure 5:
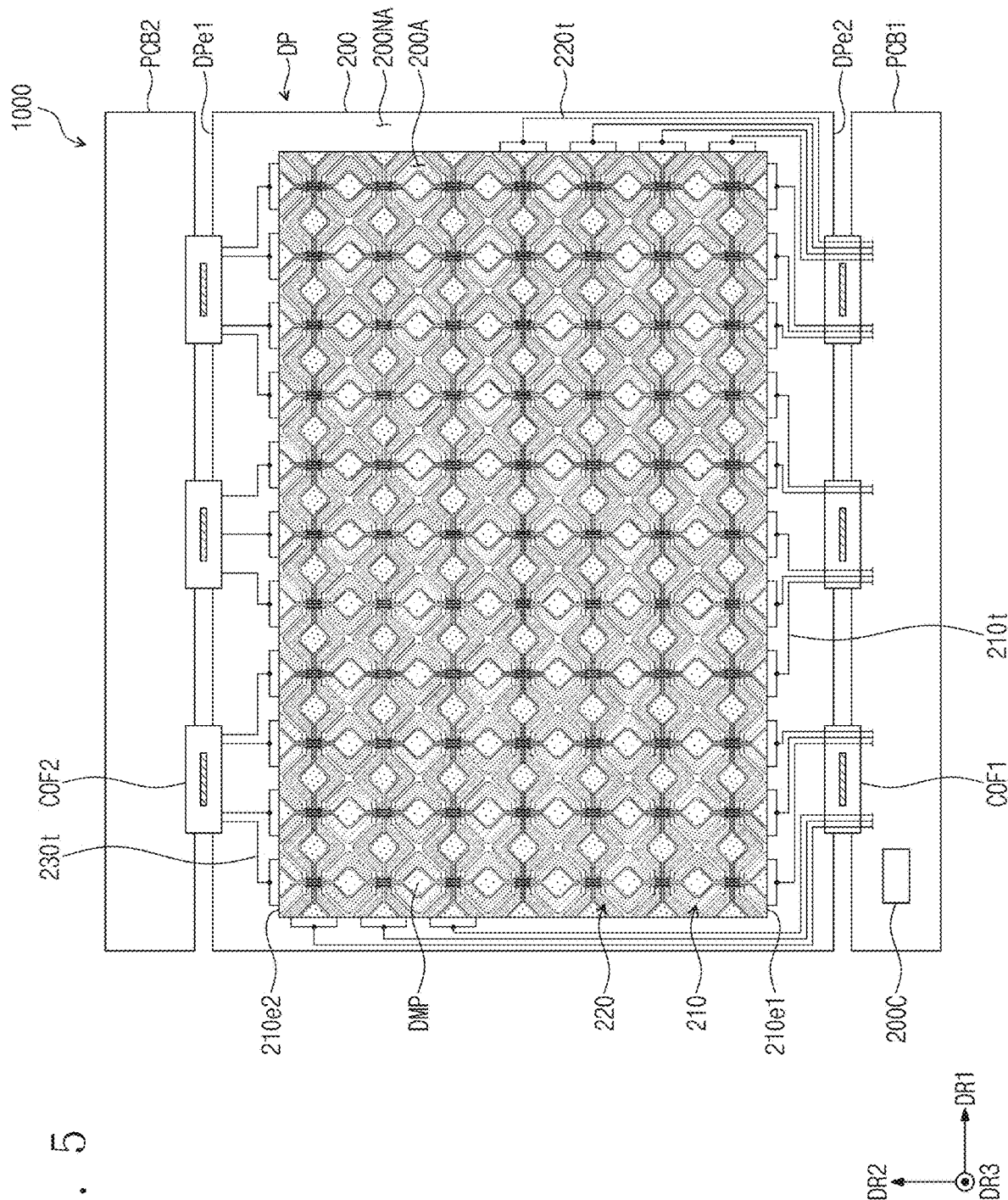
FIG. 5 is a plan view illustrating some components of an electronic device according to some embodiments of the present disclosure.

FIG. 5 is a plan view illustrating some components of the electronic device 1000, according to some embodiments of the present disclosure. The electronic device 1000 may include the display panel DP, a first circuit film COF1, a second circuit film COF2, a first circuit board PCB1, and a second circuit board PCB2.

The first circuit film COF1 may be connected to a first end portion of the display panel DP. The second circuit film COF2 may be connected to a second end portion of the display panel DP. The display panel DP may include a first edge DPe1 and a second edge DPe2. Each of the first edge DPe1 and the second edge DPe2 may extend in the first direction DR1, and the first edge (DPe1 and the second edge (DPe2 may be spaced apart in the second direction DR2. For example, the first circuit film COF1 may be overlapped with the second t edge DPe2 of the display panel DP and connected to the display panel DP. The second circuit film COF2 may be overlapped with the first edge DPe1 of the display panel DP, and connected to the display panel DP.

A chip for driving the display layer 100 may be mounted on each of the first circuit film COF1 and the second circuit film COF2. Accordingly, the first circuit film COF1 and the second circuit film COF2 may be referred to as a first chip on film (COF) and a second COF, respectively.

Although FIG. 5 illustrates that a plurality of first circuit films COF1 and a plurality of second circuit films COF2 are provided by way of example, embodiments according to the present disclosure are not limited thereto. Each of the first circuit film COF1 and the second circuit film COF2 may be provided in a singular form, or may be provided in number different from the number illustrated in drawings.

The first circuit board PCB1 may be electrically connected to the display panel DP through the first circuit film COF1, and the second circuit board PCB2 may be electrically connected to the display panel DP through the second circuit film COF2. The first circuit board PCB1 and the second circuit board PCB2 may be referred to as a first printed circuit board and a second printed circuit board.

According to some embodiments of the present disclosure, the sensor driver 200C may be integrated in the form of an integrated circuit (IC) and may be electrically connected to the sensor layer 200. For example, the sensor driver 200C may be mounted on the first circuit board PCB1.

FIG. 5 is a plan view illustrating the display panel DP, the first circuit film COF1, the second circuit film COF2, the first circuit board PCB1, and the second circuit board PCB2 in a spread state before assembled with other components, that is, before modulated with other components. For example, as each of the first circuit film COF1 and the second circuit film COF2 is bent, the first circuit board PCB1 and the second circuit board PCB2 may be located under the display panel DP.

FIG. 5 illustrates components in the display panel DP, especially, components in the sensor layer 200 in more detail. The sensor layer 200 may include a sensing region 200A and a peripheral region 200NA adjacent to the sensing region 200A defined (provided) in the sensor layer 200.

The sensor layer 200 may include a plurality of first electrodes 210 and a plurality of second electrodes 220 located in the sensing region 200A.

The first electrodes 210 may cross the second electrodes 220, respectively. The first electrodes 210 may extend in the second direction DR2, and may be arranged to be spaced apart from each other in the first direction DR1. The second electrodes 220 may extend in the first direction DR1, and the second electrodes 220 may be arranged to be spaced apart from each other in the second direction DR2. A sensing unit SU of the sensor layer 200 may be a region in which one first electrode 210 and one second electrode 220 cross each other.

FIG. 5 illustrates that 11 first electrodes 210 and seven second electrodes 220, and 77 sensing units SU, but the number of first electrodes 210 and the number of second electrodes 220 are not limited thereto.

The sensor layer 200 may further include a plurality of first trace lines 210t, a plurality of second trace lines 220t, and a plurality of third trace lines 230t located in the peripheral region 200NA. The first trace lines 210t may be electrically connected in a one-to-one correspondence to each of the first electrodes 210. The second trace lines 220t may be electrically connected in a one-to-one correspondence to each of the second electrodes 220. The third trace lines 230t may be electrically connected in a one-to-one correspondence to each of the first electrodes 210.

According to some embodiments of the present disclosure, each of the first electrodes 210 may include a first end portion 210e1 and a second end portion 210e2. The first end portion 210e1 and the second end portion 210e2 may be spaced apart from each other in the second direction DR2. The first end portions 210e1 of the first electrodes 210 may be spaced apart from each other in the first direction DR1, and the second end portions 210e2 of the first electrodes 210 may be spaced apart from each other in the second direction DR2. The first trace lines 210t may be connected to the first end portions 210e1, and the third trace lines 230t may be connected to the second end portions 210e2.

Figure 6:
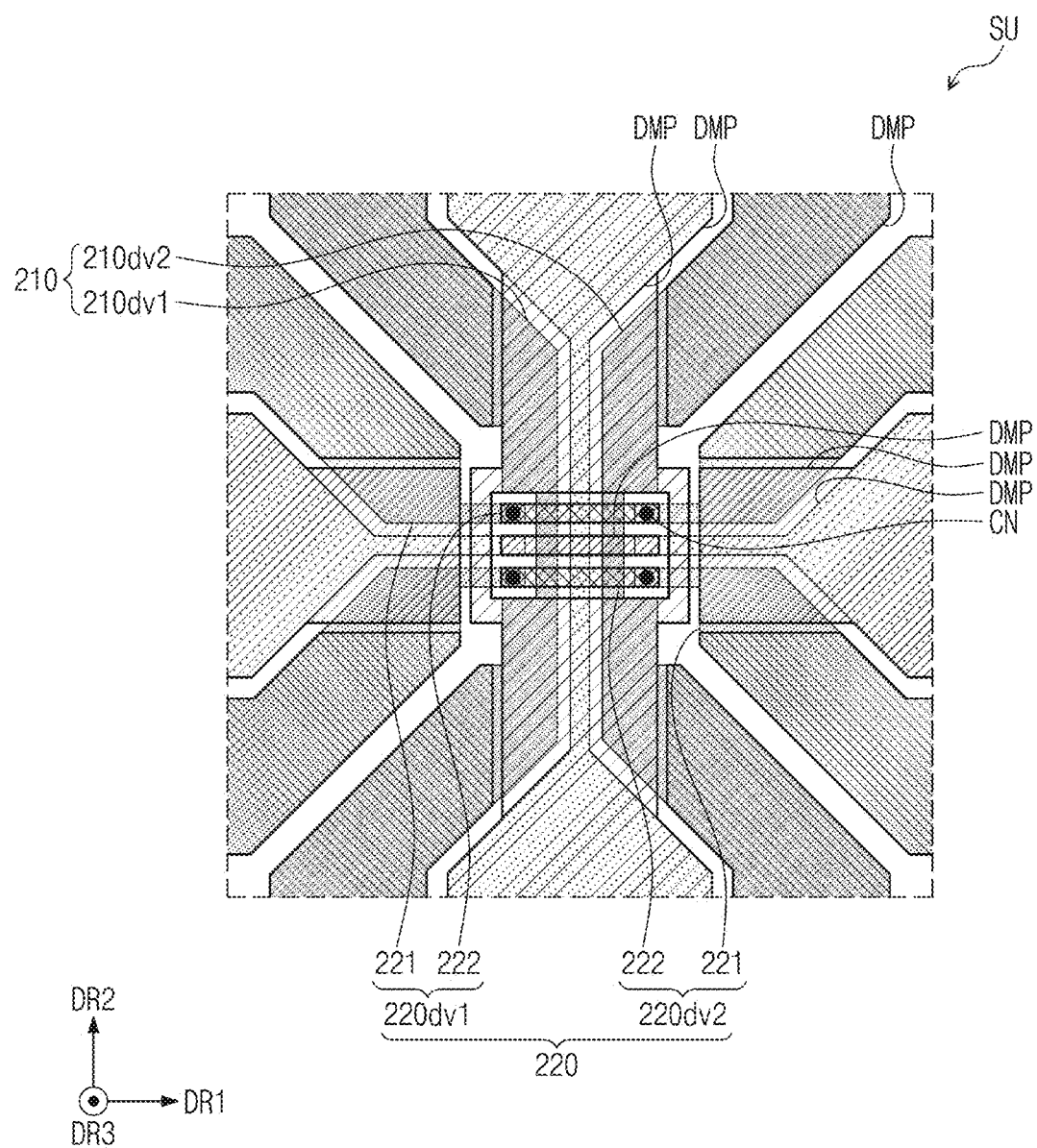
FIG. 6 is an enlarged plan view illustrating one sensing unit according to some embodiments of the present disclosure.
Figure 7A:
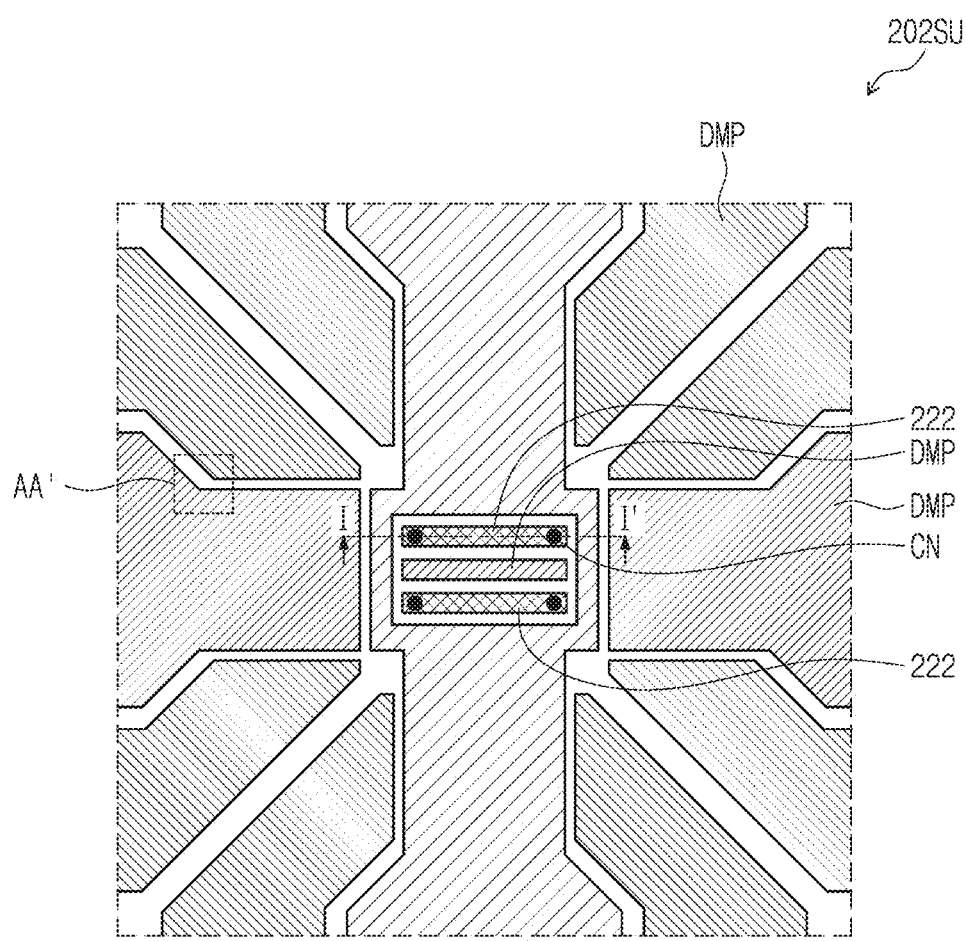
FIG. 7A is a plan view illustrating a first conductive layer of a sensing unit SU according to some embodiments of the present disclosure.
Figure 7B:
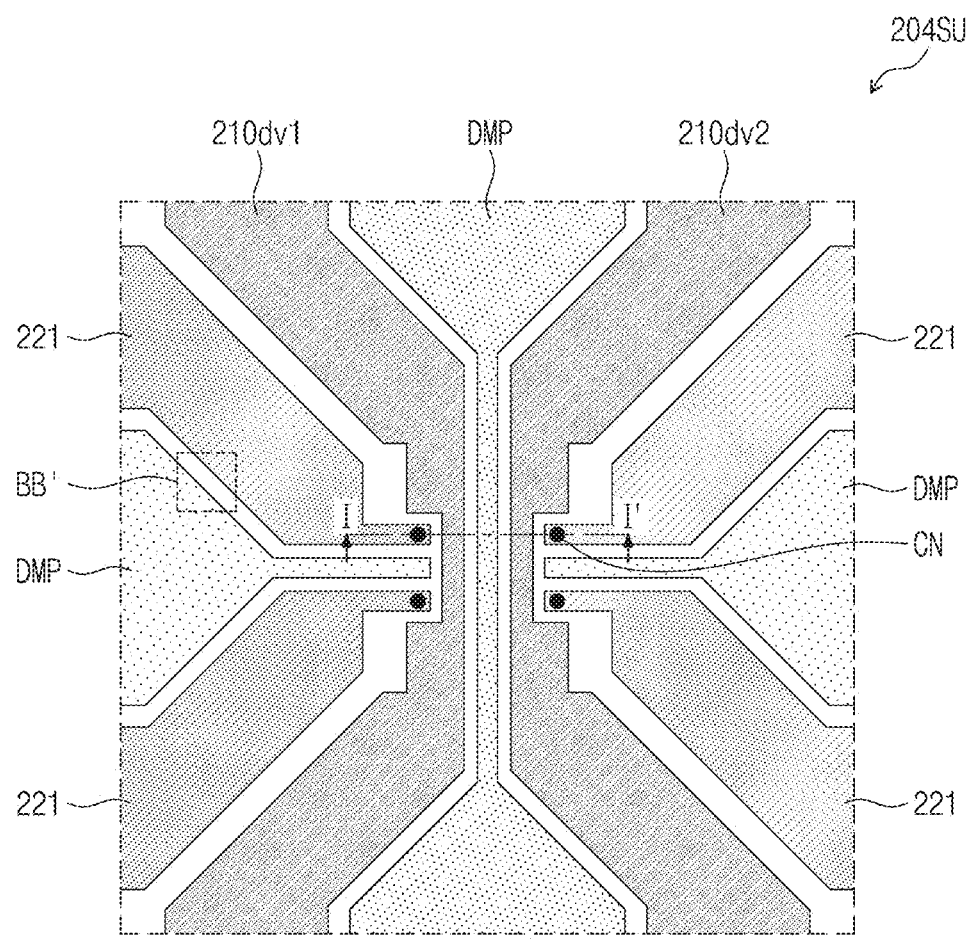
FIG. 7B is a plan view illustrating a second conductive layer of a sensing unit according to some embodiments of the present disclosure.
Figure 7B:
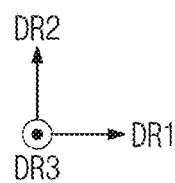
Figure 8:
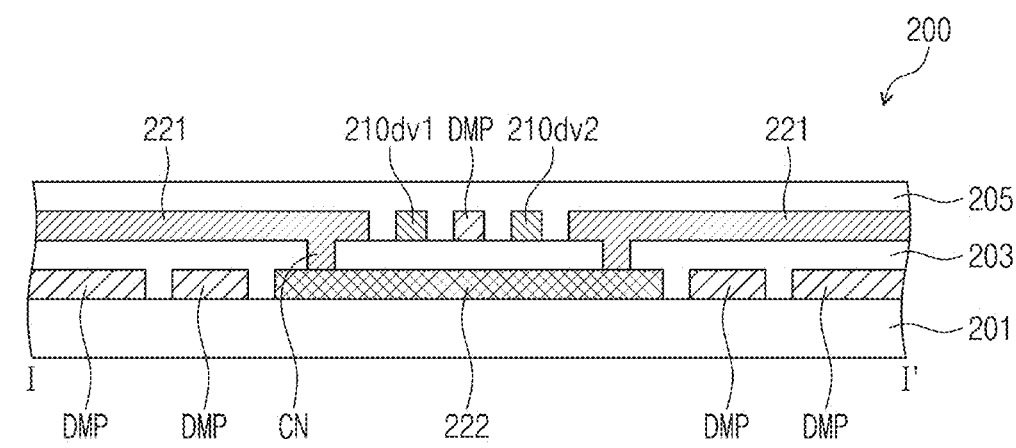
FIG. 8 is a cross-sectional view illustrating a sensor layer according to some embodiments of the present disclosure, which is taken along the line I-I' illustrated in FIGS. 7A and 7B, respectively.

FIG. 6 is an enlarged plan view illustrating the sensing unit SU according to some embodiments of the present disclosure. FIG. 7A is a plan view illustrating a first conductive layer 202SU of the sensing unit SU according to some embodiments of the present disclosure. FIG. 7B is a plan view illustrating a second conductive layer 204SU of the sensing unit according to some embodiments of the present disclosure. FIG. 8 is a cross-sectional view of the sensor layer 200 according to some embodiments of the present disclosure, which is taken along the line I-I' shown in FIGS. 7A and 7B.

Referring to FIGS. 5 and 6, each of the first electrodes 210 may include first split electrodes 210dv1 and 210dv2. The first split electrodes 210dv1 and 210dv2 may extend in the second direction DR2 and may be spaced apart from each other in the first direction DR1. The first split electrodes 210dv1 and 210dv2 may have a linearly symmetrical shape about a line extending in the second direction DR2.

Each of the second electrodes 220 may include second split electrodes 210dv1 and 210dv2. The second electrodes 220 may extend in the first direction DR1, and may be spaced apart from each other in the second direction DR2. The second split electrodes 210dv1 and 210dv2 may have a linearly symmetrical shape about a line extending in the second direction DR2.

Referring to FIGS. 6, 7A, 7B, and 8, each of the second split electrodes 210dv1 and 210dv2 may include a sensing pattern 221 and a bridge pattern 222. The sensing pattern 221 and the bridge pattern 222 are located in different layers, and may be electrically connected to each other through a contact CN. For example, the bridge pattern 222 may be included in the first conductive layer 202SU, and the sensing pattern 221 and the first split electrodes 210dv1 and 210dv2 may be included in the second conductive layer 204SU. The first conductive layer 202SU may be included in the first conductive layer 202 of FIG. 4A, and the second conductive layer 204SU may be included in the second conductive layer 204 of FIG. 4A.

According to some embodiments of the present disclosure, the sensor layer 200 may further include dummy patterns DMP located in a region in which the first electrodes 210 and the second electrodes 220 are not located. The dummy patterns DMP may be electrically floated or electrically grounded. According to some embodiments of the present disclosure, the dummy patterns DMP may be omitted. Because the dummy patterns DMP are located in an empty space, the probability that specific patterns are viewed by external light reflection may be relatively reduced. In other words, the electronic device 1000 (refer to FIG. 1) may have relatively improved in visibility by external light reflection.

Figure 9A:
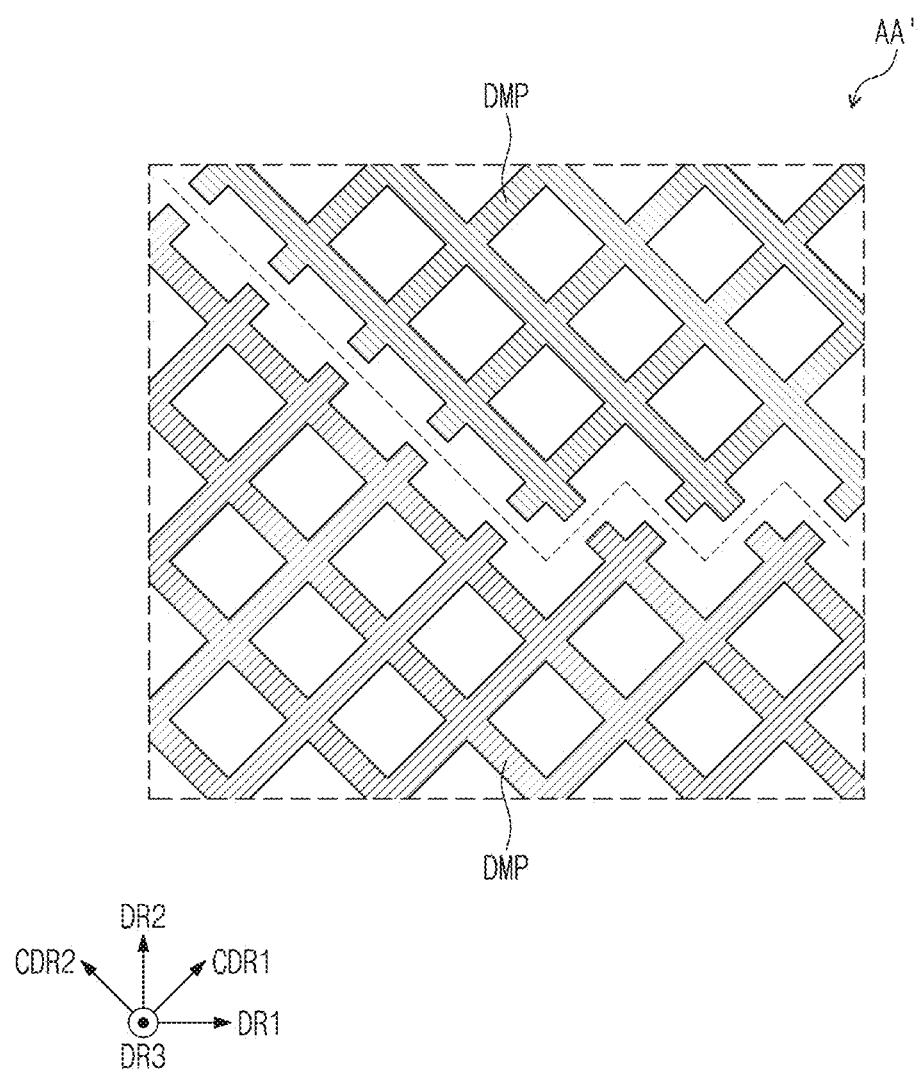
FIG. 9A is an enlarged plan view illustrating further details of the region AA' illustrated in FIG. 7A.
Figure 9B:
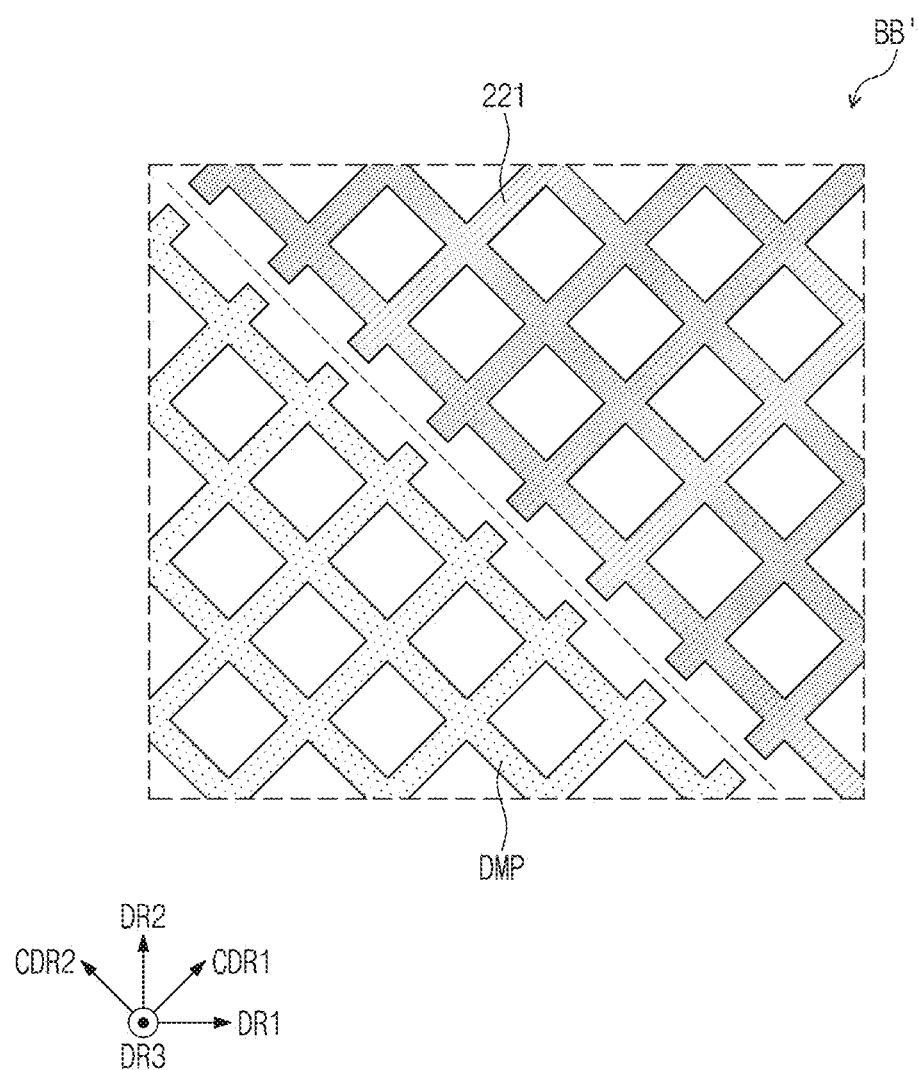
FIG. 9B is an enlarged plan view of the region BB' illustrated in FIG. 7B.

FIG. 9A is an enlarged plan view illustrating region AA' illustrated in FIG. 7A. FIG. 9B is an enlarged plan view of region BB' illustrated in FIG. 7B.

Referring to FIGS. 7A, 7B, 9A, and 9B, each of the first electrodes 210, the second electrodes 220, and the dummy patterns DMP may have a mesh structure. Each of the mesh structures may include a plurality of mesh lines. Each of the plurality of mesh lines has a linear shape extending in a specific direction and may be connected to each other. Openings having no mesh structures located therein may be defined (provided or formed) in the first electrodes 210, the second electrodes 220, and the dummy patterns DMP.

In FIGS. 9A and 9B, the mesh structure includes mesh lines extending in a first crossing direction CDR1 crossing the first direction DR1 and the second direction DR2 and mesh lines extending in a second crossing direction CDR2 crossing the first crossing direction CDR1. However, the extension direction of the mesh lines constituting the mesh structure is not specifically limited to the illustrations of FIGS. 9A and 9B. For example, the mesh structure may include only mesh lines extending in the first direction DR1 and the second direction DR2, or may include mesh lines extending in the first direction DR1, the second direction DR2, the first crossing direction CDR1 and the second crossing direction CDR2. In other words, the mesh structure may be changed in various forms.

Figure 10:
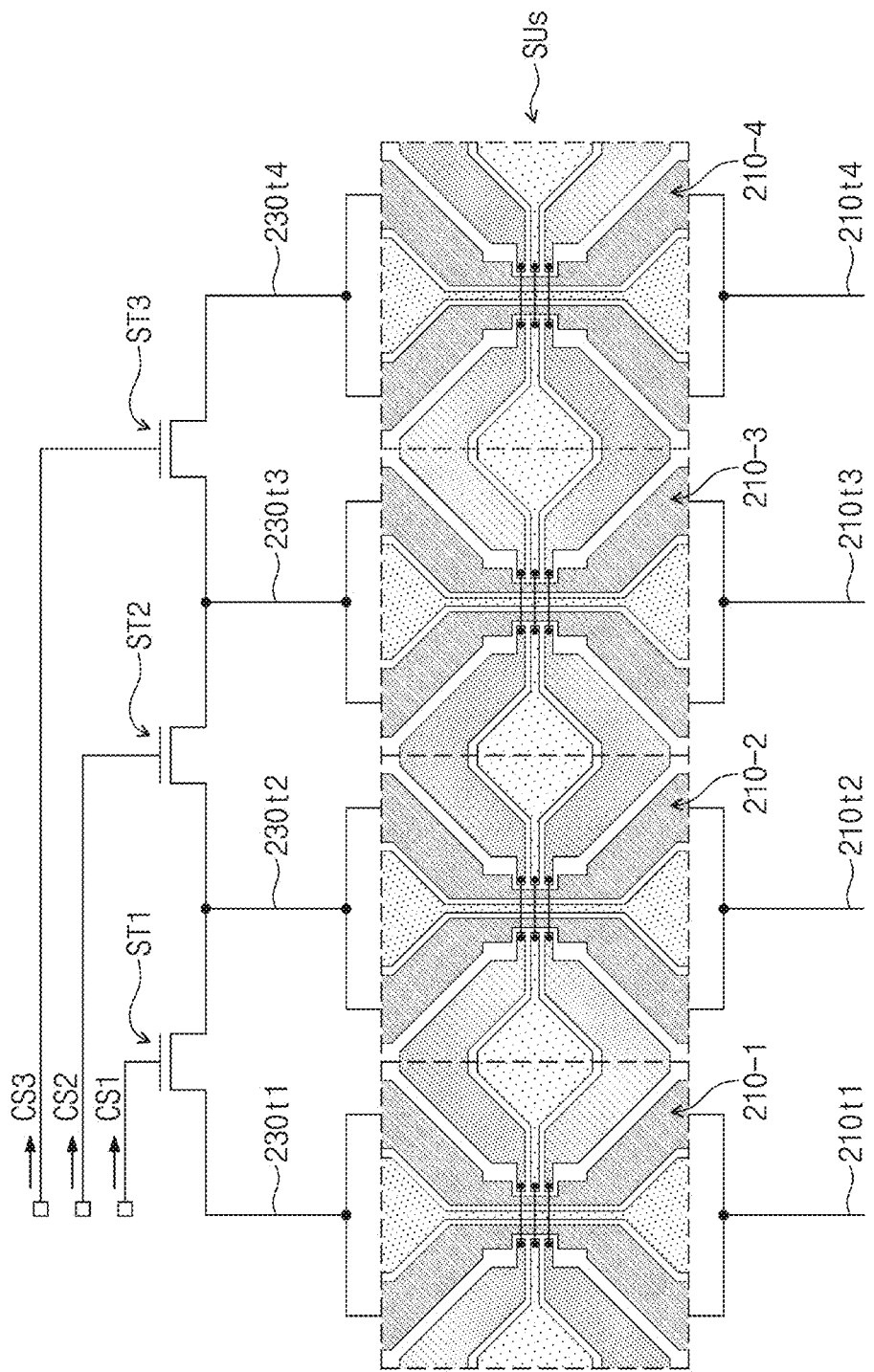
FIG. 10 is a plan view illustrating some components of an electronic device according to some embodiments of the present disclosure.

FIG. 10 is a plan view illustrating some components of the electronic device 1000, according to some embodiments of the present disclosure.

FIGS. 5 and 10 illustrate four sensing units SUs. FIGS. 5 and 10 illustrate portions of four first electrodes 210-1, 210-2, 210-3, and 210-4 are illustrated corresponding to the four sensing units SUs. First end portions of the first electrodes 210-1, 210-2, 210-3, and 210-4 may be electrically connected to first trace lines 210t1, 210t2, 210t3, and 210t4, respectively, and second end portions of the first electrodes 210-1, 210-2, 210-3, and 210-4 may be electrically connected to third trace lines 310t1, 310t2, 310t3, and 310t4, respectively.

According to some embodiments of the present disclosure, the electronic device 1000 may further include each of a plurality of switching transistors ST1, ST2, and ST3 interposed between two adjacent third trace lines among the third trace lines 310t1, 310t2, 310t3, and 310t4, and electrically connected to the two adjacent third trace lines. The first switching transistor ST1 may be interposed between the (3-1)-th trace line 310t1 and the (3-2)-trace line 310t2 and connected to the (3-1)-th trace line 310t1 and the (3-2)-trace line 310t2, the second switching transistor ST2 may be interposed between the (3-2)-th trace line 310t2 and the (3-3)-th trace line 310t3 and connected to the (3-2)-th trace line 310t2 and the (3-3)-th trace line 310t3, and the third switching transistor ST3 may be interposed between the (3-3)-th trace line 310t3 and the (3-4)-th trace line 310t4 and connected to the (3-3)-th trace line 310t3 and the (3-4)-th trace line 310t4. Accordingly, the number of the switching transistors ST1, ST2, and ST3 may be one less than the number of third trace lines 310t1, 310t2, 310t3, and 310t4.

The first switching transistor ST1 may be turned on or off in response to a first control signal CS1, the second switching transistor ST2 may be turned on or off in response to a second control signal CS2, and the third switching transistor ST3 may be turned on or off in response to a third control signal CS3.

Figure 11:
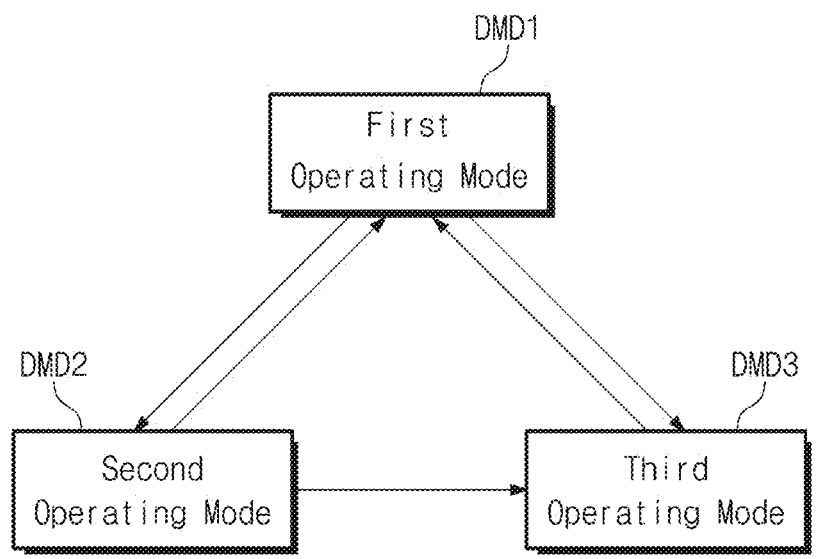
FIG. 11 is a view illustrating the operation of a sensor driver according to some embodiments of the present disclosure.

FIG. 11 is a view illustrating an operation of a sensor driver, according to some embodiments of the present disclosure.

Referring to FIGS. 3, 5, and 11, the sensor driver 200C may be configured to selectively operate in one of a first operating mode DMD1, a second operating mode DMD2, and a third operating mode DMD3.

The first operating mode DMD1 may be referred to as a touch and pen standby mode, the second operating mode DMD2 may be referred to as a touch activation and pen standby mode, and the third operating mode DMD3 may be referred to as a pen activation mode. The first operating mode DMD1 may be a mode for waiting for the first input 2000 and the second input 3000. The second operating mode DMD2 may be a mode for sensing the first input 2000 and waithing for the second input 3000. The third operating mode DMD3 may be a mode for sensing the second input 3000.

According to some embodiments of the present disclosure, the sensor driver 200C may first operate in the first operating mode DMD1. When the first input 2000 is sensed in the first operating mode DMD1, the sensor driver 200C may be switched (or changed) to the second operating mode DMD2. Alternatively, when the second input 3000 is sensed in the first operating mode DMD1, the sensor driver 200C may be switched (or changed) to the third operating mode DMD3.

Alternatively, when the second input 3000 is sensed in the second operating mode DMD2, the sensor driver 200C may be switched (or changed) to the third operating mode DMD3. Alternatively, when the first input 2000 is released (not sensed) in the second operating mode DMD2, the sensor driver 200C may be switched (or changed) to the first operating mode DMD1. Alternatively, when the second input 3000 is released in the third operating mode DMD3, the sensor driver 200C may be switched (or changed) to the first operating mode DMD1.

Figure 12:
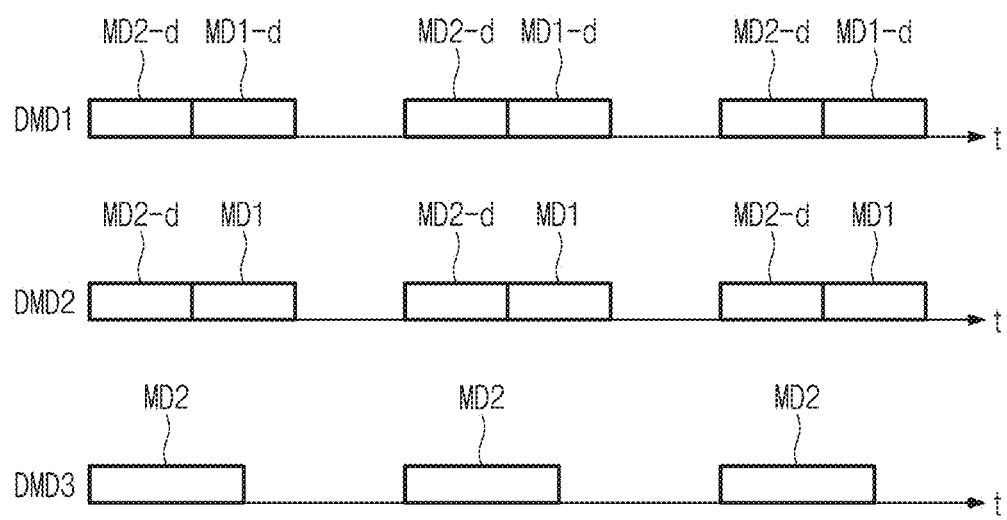
FIG. 12 is a view illustrating the operation of a sensor driver according to some embodiments of the present disclosure.

FIG. 12 is a view illustrating an operation of a sensor driver according to some embodiments of the present disclosure.

Referring to FIGS. 3, 5, 11, and 12, operations in the first to third operating modes DMD1, DMD2, and DMD3 are illustrates in order of time (t).

In the first operating mode DMD1, the sensor driver 200C may alternately and iteratively in a second mode MD2-$d$ and a first mode MD1-$d$. During the second mode MD2-$d$, the sensor layer 200 may be scan-driven to detect the second input 3000. During the first mode MD1-$d$, the sensor layer 200 may be scan-driven to detect the first input 2000. FIG. 12 illustrates that the sensor driver 200C operates in the first mode MD1-$d$ subsequently to the second mode MD2-$d$, but embodiments according to the present disclosure are not limited thereto.

In the second operating mode DMD2, the sensor driver 200C may alternately and iteratively in the second mode MD2-$d$ and the first mode MD1. During the second mode MD2-$d$, the sensor layer 200 may be scan-driven to detect the second input 3000. During the first mode MD1, the sensor layer 200 may be scan-driven to detect coordinates from the first input 2000.

In the third operating mode DMD3, the sensor driver 200C may operate in the second mode MD2. During the second mode MD2-$d$, the sensor layer 200 may be scan-driven to detect coordinates from the second input 3000. In the third operating mode DMD3, the sensor driver 200C may not operate in the first mode MD1-$d$ or MD1 until the second input 3000 is released (or not detected).

Figure 13A:
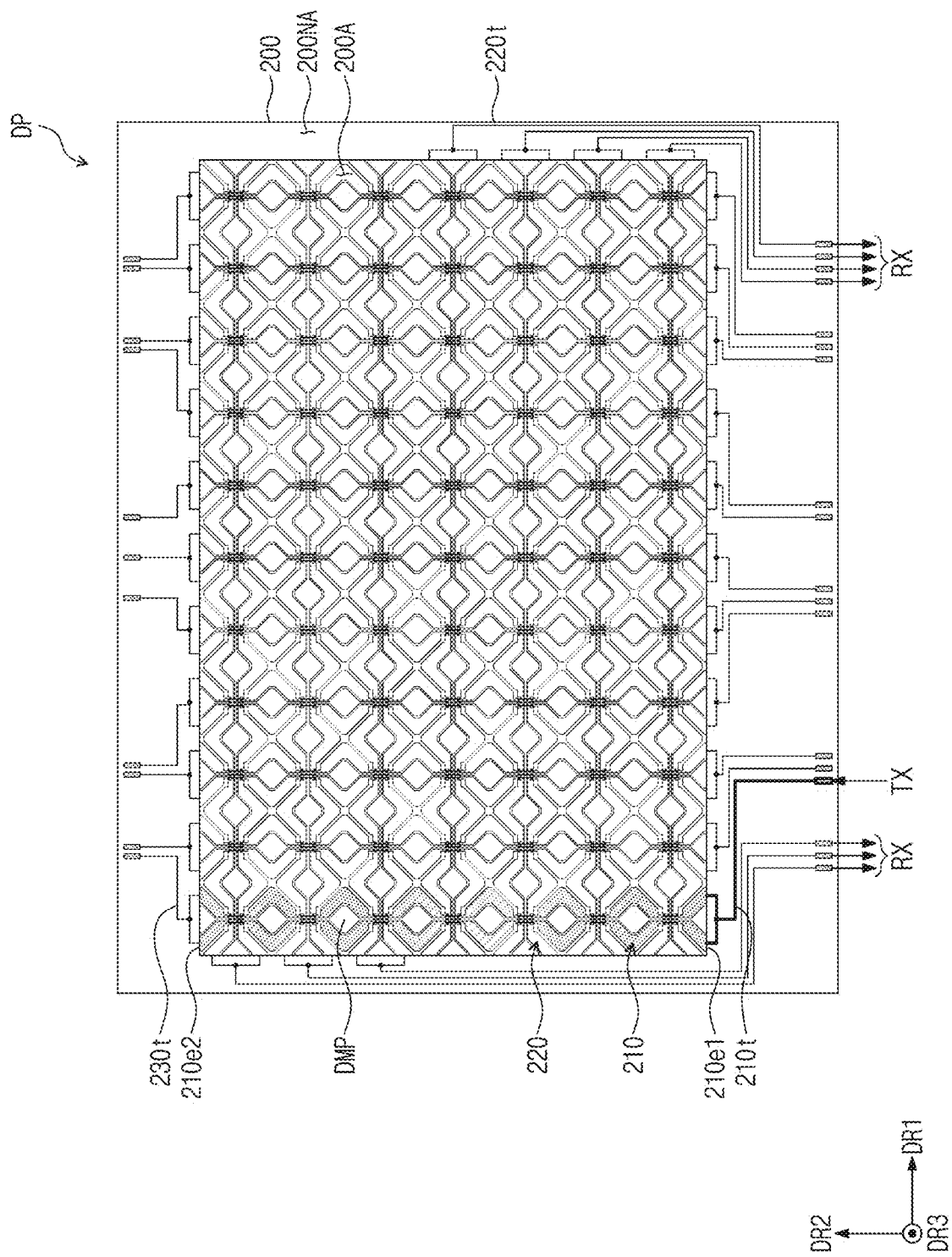
FIG. 13A is a view illustrating a first mode according to some embodiments of the present disclosure.

FIG. 13A is a view illustrating the first mode according to some embodiments of the present disclosure.

Referring to FIGS. 3, 12, and 13A, the first mode MD1-$d$ of the first operating mode DMD1 and the first mode MD1 of the second operating mode DMD2 may include a mutual capacitance detection mode. FIG. 13 is a view illustrating a mode for detecting a mutual capacitance in the first mode MD1-$d$ of the first operating mode DMD1 and the first mode MD1 of the second operating mode DMD2.

In the mutual capacitance detection mode, the sensor driver 200C may sequentially provide a transmit signal TX to the first electrodes 210, and detect coordinates for the first input 2000 by using a receive signal RX detected through the second electrodes 220. For example, the sensor driver 200C may be configured to calculate input coordinates by sensing the change in mutual capacitance between the first electrodes 210 and the second electrodes 220.

FIG. 13A illustrates that the transmit signal TX is provided to one first electrode 210 and the receive signal RX is output from the second electrodes 220. For clearly expressing a signal, one first electrode 210 receiving the transmit signal TX is expressed in a bold line as illustrated in FIG. 13. The sensor driver 200C may detect the input coordinates for the first input 2000 by sensing the change in the capacitance between the first electrode 210 and the second electrodes 220.

According to some embodiments of the present disclosure, at least one of the first mode MD1-$d$ of the first operating mode DMD1 or the first mode MD1 of the second operating mode DMD2 may further include a mode for detecting a self-capacitance. In the mode for detecting the self-capacitance, the sensor driver 200C may be configured to output driving signals to the first electrodes 210 and the second electrodes 220, and to calculate the input coordinates by sensing the change in capacitance of each of the first electrodes 210 and the second electrodes 220.

Figure 13B:
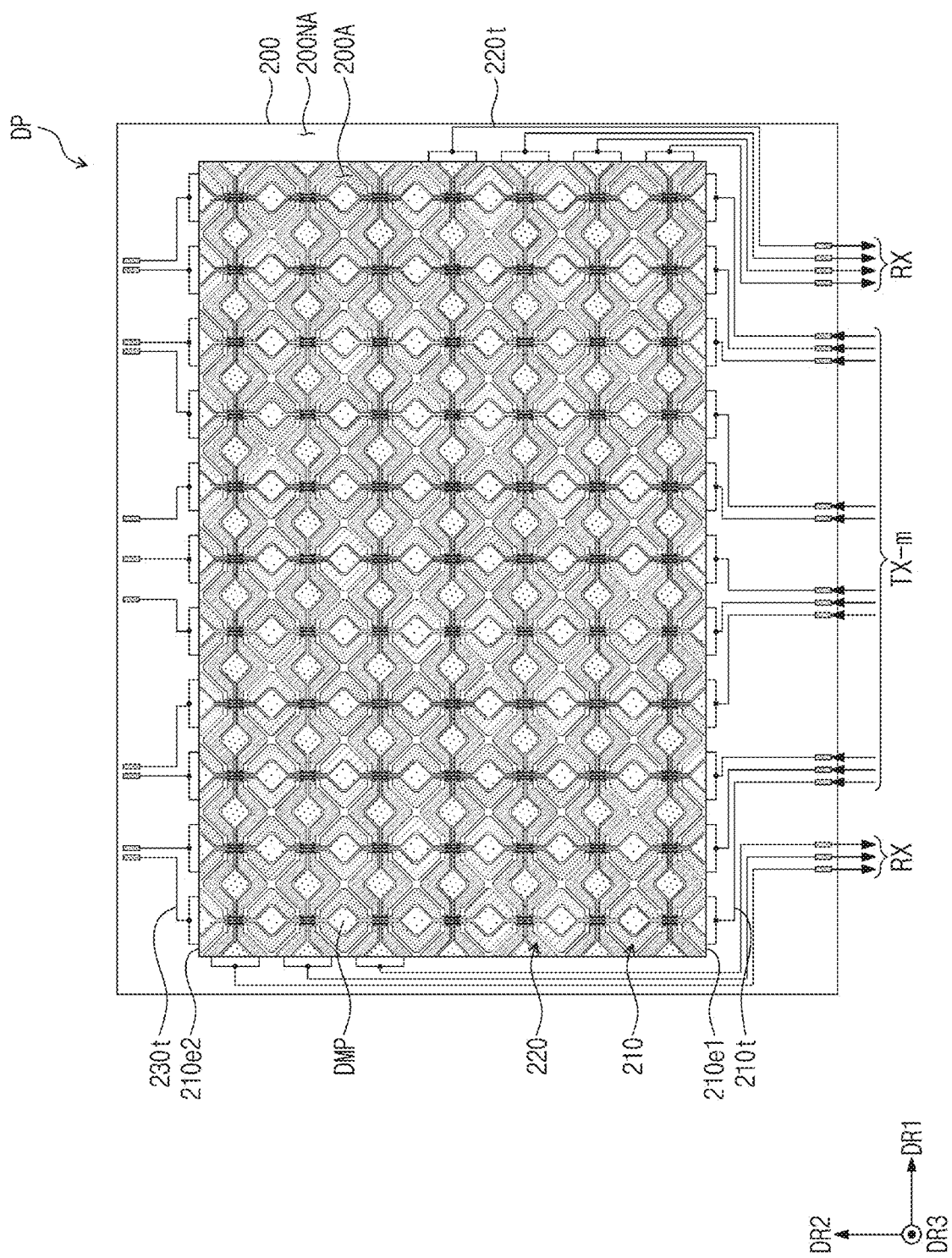
FIG. 13B is a view illustrating a first mode according to some embodiments of the present disclosure.

Referring to FIGS. 10 and 13B, in the first mode, the third trace lines 310$t$ may be electrically isolated from each other. For example, in the first mode, the transistors ST1, ST2, and ST3 may be configured to be turned off. Accordingly, in the first mode, second end portions of the first electrodes 210 may be floated.

FIG. 13B is a view illustrating the first mode, according to some embodiments of the present disclosure. In the following description made with reference to FIG. 13B, components the same as those of FIG. 13A will be assigned with the same reference numerals, and the duplication thereof will be omitted to avoid redundancy.

In the mode for detecting the mutual capacitance, the sensor driver 200C may simultaneously (or concurrently) provide transmit signals TX-m to at least some of the first electrodes 210, and detect coordinates for the first input 2000 by using the receive signals RX detected through the second electrodes 220. Some of the transmit signals TX-m may have waveforms, amplitudes, or phases different from those of remaining signals. The examples are one example, but embodiments according to the present disclosure are not limited thereto.

According to some embodiments of the present disclosure, the sensor driver 200C may simultaneously (or concurrently) provide the transmit signals TX-m to the first electrodes 210. However, this is provided only for the illustrative purpose. The sensor driver 200C may simultaneously (or concurrently) provide the transmit signals TX-m to some first electrodes 210 among the first electrodes 210.

Figure 14:
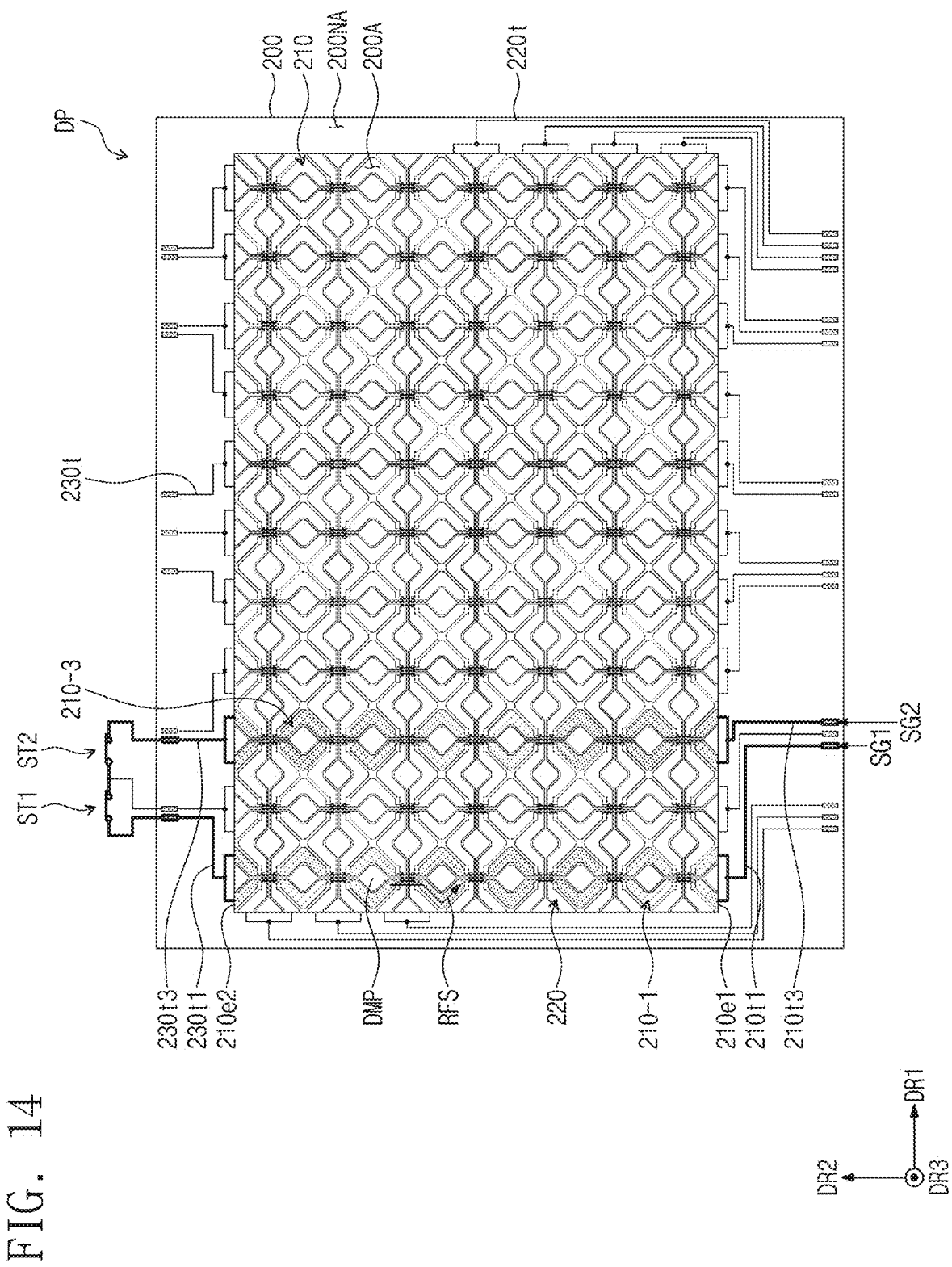
FIG. 14 is a view illustrating a second mode according to some embodiments of the present disclosure.
Figure 15A:
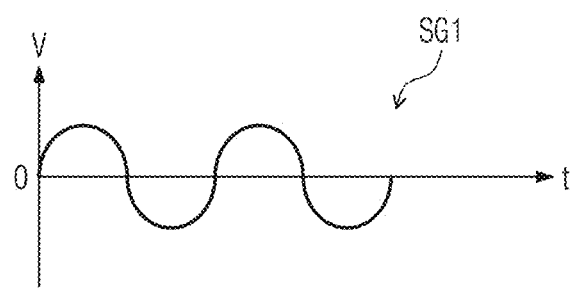
FIG. 15A is a graph illustrating a waveform of a first signal according to some embodiments of the present disclosure.
Figure 15B:
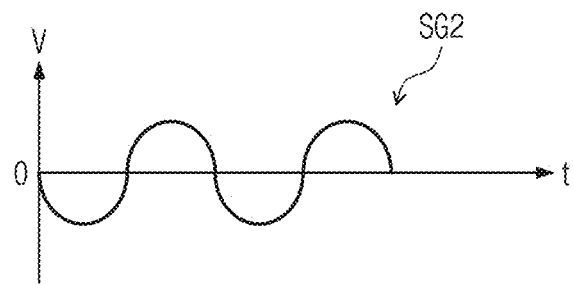
FIG. 15B is a graph illustrating the waveform of a first signal according to some embodiments of the present disclosure.

FIG. 14 is a view illustrating the second mode, according to some embodiments of the present disclosure. FIG. 15A is a graph illustrating a waveform of a first signal, according to some embodiments of the present disclosure. FIG. 15B is a graph illustrating the waveform of the first signal, according to some embodiments of the present disclosure.

Referring to FIGS. 3, 14, 15A, and 15B, the second mode MD2 may include a charging driving mode. The charging driving mode may include a searching charging driving mode and a tracking charging driving mode.

The searching charging driving mode may be a driving mode before sensing the position of the pen. Accordingly, a first signal SG1 or a second signal SG2 may be provided sequentially to all channels included in the sensor layer 200. In other words, the whole region of the sensor layer 200 may be scanned in the searching charging driving mode. In the searching charging driving mode, when the pen PN (see FIG. 3) is sensed, the sensor layer 200 may be driven in the tracking charging driving mode. For example, in the tracking charging driving mode, the sensor driver 200C may sequentially output the first signal SG1 and the second signal SG2 to a region overlapped with a point at which the pen PN is sensed, instead of the entire region of the sensor layer 200.

In the charging driving mode, the sensor driver 200C may apply the first signal SG1 to a first pad and the second signal SG2 to a second pad. The second signal SG2 may be a signal inverse to the first signal SG1. For example, the first signal SG1 may be a sinusoidal signal.

Because the first signal SG1 and the second signal SG2 are applied to the at least two pads, a current RFS may have a current path flowing to the second pad through the first pad. In the charging driving mode, at least some of the second end portions 210e2 of the first electrodes 210 are connected to each other to define a current path. The current path may include one (1-1)-th trace line 210t1 among the first trace lines 210t, one first electrode 210-1, which is connected to one (1-1)-th trace line 210t1, among the first electrodes 210, another first electrode 210-3 among the first electrodes 210, and another (1-3)-th trace line 210t3, which is electrically connected to another first electrode 210-3, among the first trace lines 210t.

According to some embodiments of the present disclosure, to provide the current path, at least some of the third trace lines 310t may be electrically connected to each other. Referring to FIG. 10, in the charging driving mode, at least some switching transistors ST1 and ST2 among the switching transistors ST1, ST2, and ST3 may be configured to be turned on.

Because the first signal SG1 and the second signal SG2 are sinusoidal signals having an inverse phase relationship with each other, the direction of the current RFS may be periodically changed. According to some embodiments of the present disclosure, the first signal SG1 and the second signal SG2 may be square wave signals having an inverse phase relationship with each other.

When the first signal SG1 and the second signal SG2 have an inverse phase relationship, noise caused in the display layer 100 (see FIG. 3) by the first signal SG1 may be canceled out from noise caused by the second signal SG2. Accordingly, a flicker phenomenon may not occur in the display layer 100, and display quality of the display layer 100 may be relatively improved.

According to some embodiments of the present disclosure, the first signal SG1 may be a sinusoidal signal. However, embodiments according to the present disclosure are not limited thereto, and the first signal SG1 may be a square wave signal. In addition, the second signal SG2 may have a specific constant voltage. For example, the second signal SG2 may be a ground voltage. In other words, the pad receiving the second signal SG2 may be grounded. Even in this case, the current RFS may flow from the first pad to the second pad. In addition, even if the second pad is grounded, because the first signal SG1 is a sinusoidal signal or a square wave signal, the direction of the current RFS may be periodically changed.

According to some embodiments of the present disclosure, as the switching transistors ST1, ST2, and ST3 electrically connected to the first electrodes 210 are controlled to be turned on or off, the first electrodes 210 may be utilized in the charging driving mode for charging the pen, as well as the first mode for sensing the touch input. Accordingly, the separate design of the pattern for the charging path may be omitted, such that the degree of freedom in design may be relatively improved.

In addition, the resistance of the current path formed using the first electrodes 210 may be lower than that of the current path formed using the dummy pattern. Accordingly, the charging current may be sufficiently ensured upon charging driving. In particular, when the current path is implemented by utilizing the first electrodes 210 having lower resistance, the sensor layer 200 for sensing both the touch input and the pen input may be extensively applied to a medium and large-scale electronic device, such as a larger tablet or a larger monitor, as well as a smaller electronic device such as a cellular phone.

FIG. 16 is a table illustrating signals provided to a sensor layer, according to some embodiments of the present disclosure.

Referring to FIGS. 14, 15A, 15B, and 16, the table illustrated in FIG. 16 shows signals or states provided to the first trace lines 210t1, 210t2, 210t3, 210t4, 210t5, 210t6, 210t7, 210t8, 210t9, 210t10, and 210t11, during the first to ninth periods t1, t2, t3, t4, t5, t6, t7, t7, and t9. The first trace lines 210t1, 210t2, 210t3, 210t4, 210t5, 210t6, 210t7, 210t8, 210t9, 210t10, and 210t11 may be sequentially connected in a one-to-one correspondence to the first electrodes 210 arranged in the first direction DR1.

Signals described on the table illustrated in FIG. 16 may be signals provided to the sensor layer 200 in the searching charging driving mode. Accordingly, because the position of the pen PN is not sensed, the first signal SG1 or the second signal SG2 may be sequentially provided to all channels included in the sensor layer 200. In other words, the whole region of the sensor layer 200 may be scanned in the searching charging driving mode.

In the second mode, the charging driving mode and the pen sensing driving mode may be alternately iterated. For example, during the first period t1, the sensor layer 200 may operate in the pen sensing driving mode after being charging-driven. When the pen is not sensed, the sensor layer 200 may be charging-driven during the second period t2. Alternatively, when a pen is sensed, the sensor layer 200 may operate in the tracking charging driving mode. In the searching charging driving mode, when the pen PN is sensed, the sensor layer 200 may operate in the tracking charging driving mode. For example, in the tracking charging driving mode, the sensor driver 200C may sequentially output the first signal SG1 and the second signal SG2 to the region overlapped with a point at which the pen PN is sensed, instead of the entire region of the sensor layer 200.

The first signal SG1 may be provided to the (1-1)-th trace line 210t1 during the first period t1, and the second signal SG2 may be provided to the (1-3)-th trace line 210t3. The pads connected to the remaining first trace lines 210t2, 210t4, 210t5, 210t6, 210t7, 210t8, 210t9, 210t10, and 210t11 to which the first signal SG1 and the second signal SG2 are not provided may all be floated FL. A shift is made in one channel unit, and the first signal SG1 and the second signal SG2 may be provided during the second to ninth periods t2 to t9

FIG. 16 illustrates that each of the first signal SG1 and the second signal SG2 is provided to a relevant one first trace line, but embodiments according to the present disclosure are not limited thereto. For example, the same signal may be provided to the plurality of channels. For example, during the first period t1, the first signal SG1 may be provided to the (1-1)-th trace line 210t1 and the (1-2)-th trace line 210t2, and the second signal SG2 may be provided to the (1-4) trace line 210t4 and the (1-5)-th race line 210t5. When the same signal is provided to a plurality of channels, an effect of reducing the resistance may be derived. Therefore, as the resistance is decreased, the power consumption in the sensor layer 200 may be relatively reduced In addition, FIG. 16 illustrates that one floating channel (hereinafter, referred to as a "gap channel") between the channel for providing the first signal SG1 and the channel for providing the second signal SG2. As the number of gap channels is increased, the strength of the magnetic field formed by the current RFS may be increased. Accordingly, the number of gap channels may be changed according to a usage condition of the electronic device 1000 (refer to FIG. 1) or a type of pen.

Referring to FIG. 14 together, FIG. 14 schematically illustrates a state of the sensor layer 200 during the first period t1. For example, a second end portion of the first electrode 210 connected to the first trace line 210t1 and a second end portion of the first electrode 210 connected to the first trace line 210t3 may be electrically connected to each other. Accordingly, a current path may be defined by the first trace line 210t1, the first electrode 210 connected to the first trace line 210t1, the first electrode 210 connected to the first trace line 210t3, and the first trace line 210t3. The current RFS may flow through the current path. The current path may have a coil shape. Accordingly, in the charging driving mode of the second mode, the resonant circuit of the pen PN may be charged by the magnetic field formed by the current path.

According to the present disclosure, a current path of a loop coil pattern may be implemented by components included in the sensor layer 200. Accordingly, the electronic device 1000 (refer to FIG. 1) may charge the pen PN by using the sensor layer 200. Therefore, because a component having a coil for charging the pen PN does not need to be separately added, an increase in thickness, an increase in weight, and a decrease in flexibility of the electronic device 1000 may not occur.

In the charging driving mode, the second electrodes 220 and the dummy patterns DMP may be grounded, may be applied with a constant voltage, or may be electrically floated. In particular, the second electrodes 220 and the dummy patterns DMP may be floated. In this case, the current RFS may not flow to the second electrodes 220 and the dummy patterns DMP.

Figure 17A:
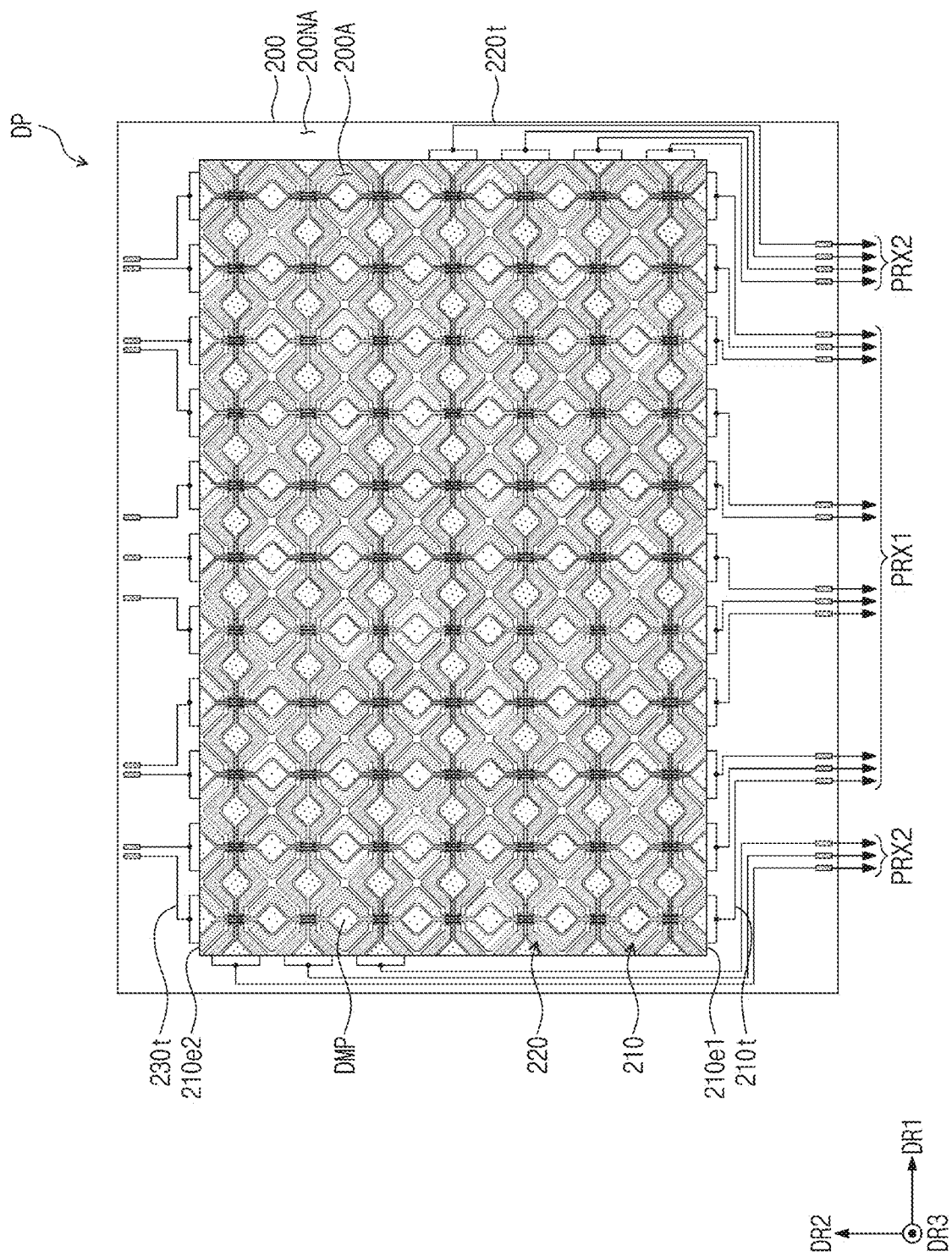
FIG. 17A is a view illustrating a second mode according to some embodiments of the present disclosure.
Figure 17B:
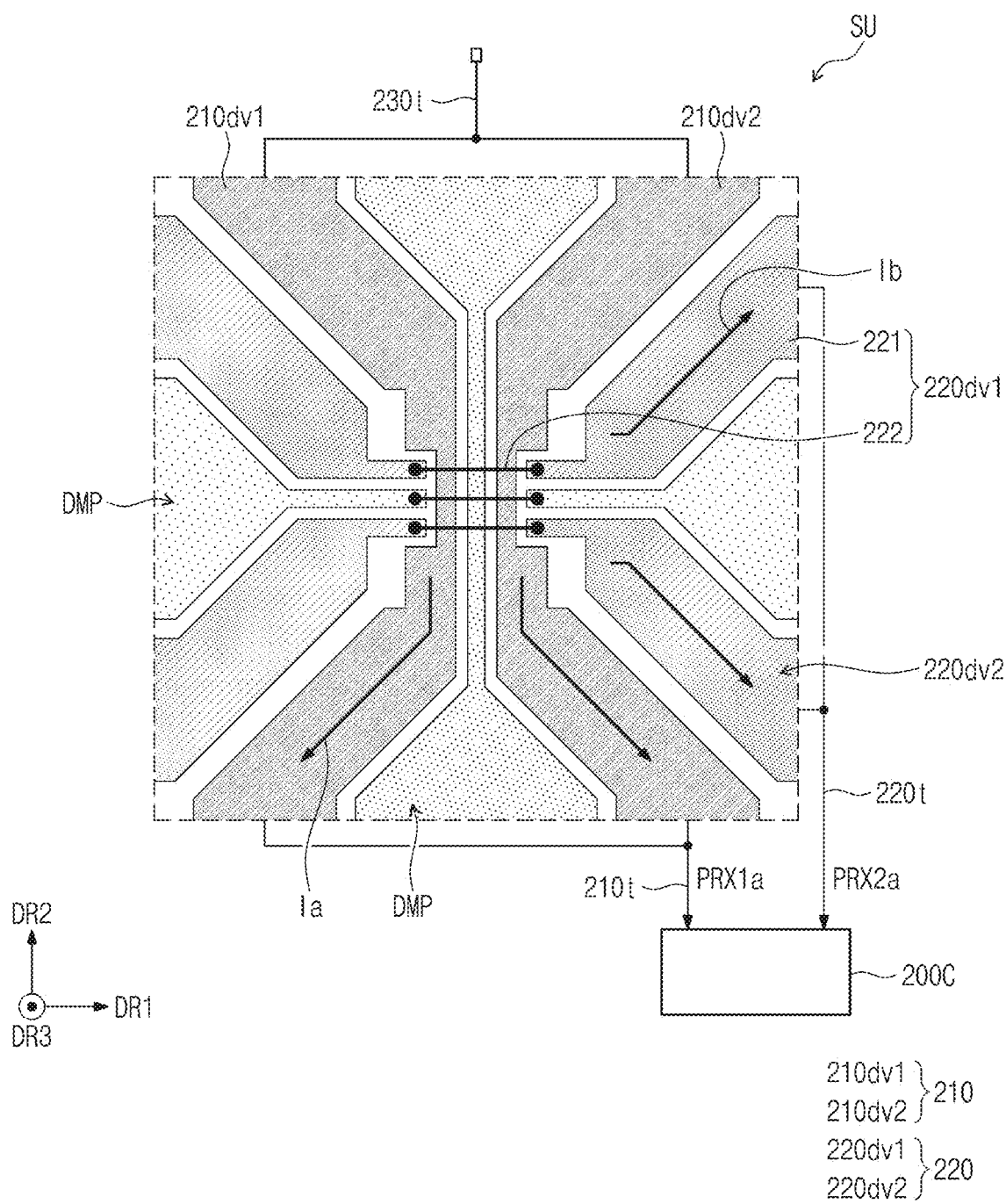
FIG. 17B is a view illustrating a sensing unit in a second mode according to some embodiments of the present disclosure.

FIG. 17A is a view illustrating a second mode, according to some embodiments of the present disclosure. FIG. 17B is a view illustrating the sensing unit in the second mode, according to some embodiments of the present disclosure.

Referring to FIGS. 17A and 17B, the second mode may include a charging driving mode and a pen sensing driving mode. FIGS. 17A and 17B are views illustrating the pen sensing driving mode.

Referring to FIG. 17A, in the pen sensing driving mode, first receive signals PRX1 may be output from the first electrodes 210 and second receive signals PRX2 may be output from the second electrodes 220. FIG. 17B illustrates one sensing unit SU through which first and second induced currents Ia and Ib generated by the pen PN flow.

An RLC resonance circuit of the pen PN may discharge a magnetic field having a resonance frequency while discharging charges from the RLC resonance circuit. The first induced current Ia may be generated from the first electrode 210 by a magnetic field provided by the pen PN, and the second induced current Ib may be generated from the second electrode 220.

The sensor driver 200C may receive a first receive signal PRX1a, which is based on the first induced current Ia, from the first electrode 210, and a second receive signal PRX2a, which is based on the second induced current Ib, from the second electrode 220. The sensor driver 200C may detect input coordinates of the pen PN based on the first receive signal PRX1a and the second receive signal PRX2a.

When the sensor driver 200C receives the first receive signal PRX1a from the first electrode 210 and receives the second receive signal PRX2a from the second electrode 220, the second end portion of the first electrode 210, for example, the third trace line 310t may be floated.

Figure 18A:
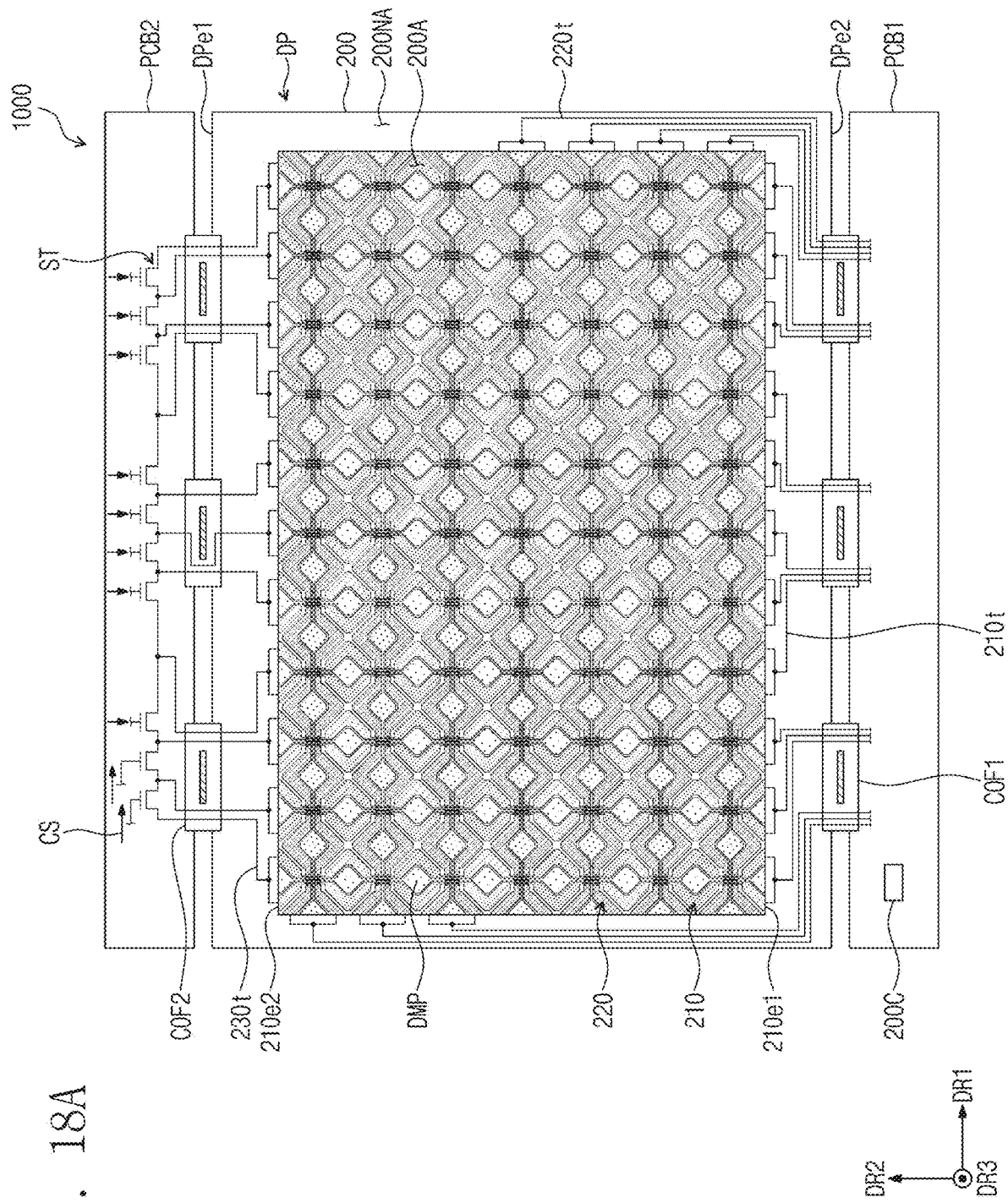
FIG. 18A is a plan view illustrating some components of the electronic device according to some embodiments of the present disclosure.

FIG. 18A is a plan view illustrating some components of the electronic device, according to some embodiments of the present disclosure. FIG. 18B is a plan view illustrating some components of the electronic device, according to some embodiments of the present disclosure.

FIG. 18A is a plan view illustrating the display panel DP, the first circuit film COF1, the second circuit film COF2, the first circuit board PCB1, and the second circuit board PCB2 in a spread state before assembled with other components, that is, before modulated with other components. FIG. 18B is a view illustrating a state in which each of the first circuit film COF1 and the second circuit film COF2 is bent to be assembled with other components, such that the first circuit board PCB1 and the second circuit board PCB2 are located under the display panel DP, and a connection film FFC is connected to the first circuit board PCB1 and the second circuit board PCB2.

Referring to FIGS. 10, 18A, and 18B, the sensor driver 200C may be mounted on the first circuit board PCB1, and the plurality of switching transistors ST may be provided on the second circuit board PCB2.

According to some embodiments of the present disclosure, the operations of the switching transistors ST may be controlled by the sensor driver 200C. In other words, the control signals CS for controlling the switching transistors ST may be provided from the sensor driver 200C. Accordingly, the electronic device 1000 may further include a connection film FFC connected to the first circuit board PCB1 and the second circuit board PCB2.

Figure 19:
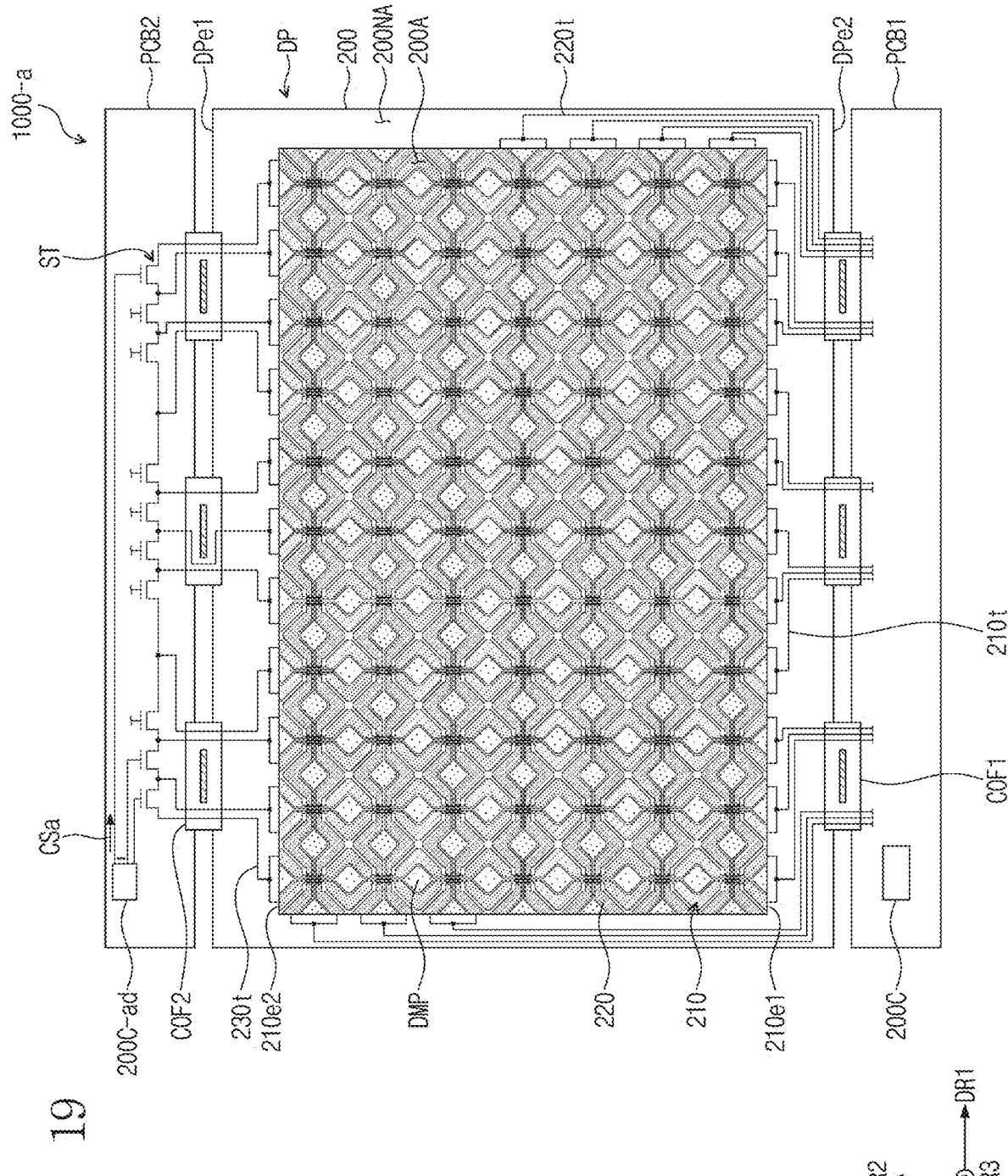
FIG. 19 is a plan view illustrating some components of an electronic device according to some embodiments of the present disclosure.

FIG. 19 is a plan view illustrating some components of an electronic device 1000-a, according to some embodiments of the present disclosure. In the following description made with reference to FIG. 19, components the same as those of FIG. 18 will be assigned with the same reference numerals, and the duplication thereof will be omitted to avoid redundancy.

Referring to FIGS. 10 and 19, the electronic device 1000-a may further include an additional sensor driver 200C-ad mounted on the second circuit board PCB2. According to some embodiments of the present disclosure, the operations of the switching transistors ST may be controlled by the additional sensor driver 200C-ad. In other words, control signals CSa for controlling the switching transistors ST may be provided from the additional sensor driver 200C-ad.

Figure 20:
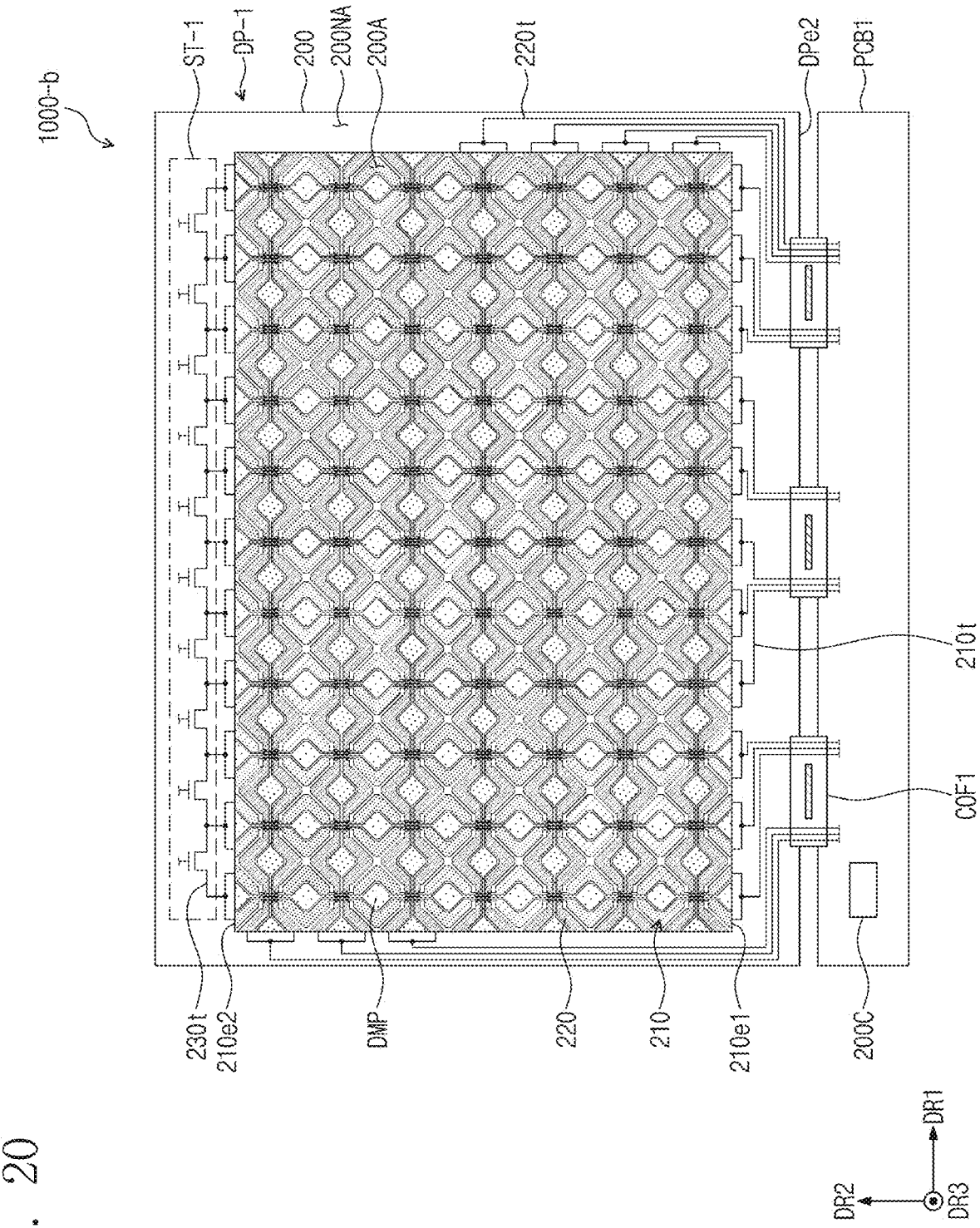
FIG. 20 is a plan view illustrating some components of an electronic device according to some embodiments of the present disclosure.

FIG. 20 is a plan view illustrating some components of an electronic device 1000-b, according to some embodiments of the present disclosure.

Referring to FIG. 20, the electronic device 1000-b may include a display panel DP-1, the first circuit films COF1, and the first circuit board PCB1.

According to some embodiments of the present disclosure, switching transistors ST-1 to control the connection of the second end portions 210e2 of the first electrodes 210 may be provided in the display panel DP-1. For example, the switching transistors ST-1 may be provided in the display layer 100, especially, the circuit layer 120 illustrated in FIG. 4A. The switching transistors ST-1 may be simultaneously (or concurrently) formed through the same process as that of the transistor 100PC.

According to embodiments described with reference to FIGS. 18A, 19, and 20, as the switching transistors ST or ST-1 electrically connected to the first electrodes 210 are controlled to be turned on or off, the first electrodes 210 may be utilized even in the charging driving mode for charging the pen, as well as the first mode for sensing the touch input. Accordingly, the separate design of the pattern for the charging path may be omitted, such that the degree of freedom in design of the sensor layer 200 may be relatively improved. In particular, when the current path is implemented by utilizing the first electrodes having lower resistance, the sensor layer 200 for sensing both the touch input and the pen input may be extensively applied to a medium and large-scale electronic device, such as a larger tablet or a larger monitor, as well as a smaller electronic device such as a cellular phone.

As described above, the switching transistors electrically connected to the first electrodes may be controlled to be turned on or off, such that the first electrodes may be utilized even in the charging driving mode for charging the pen with power, as well as the first mode for sensing the touch input. Accordingly, the separate design of the pattern for the charging path may be omitted, such that the degree of freedom in design of the sensor layer may be relatively improved. In addition, the resistance of the current path formed by utilizing the first electrodes may be lower than that of the current path formed using the dummy pattern. Accordingly, the charging current may be sufficiently ensured upon charging driving. In particular, when the current path is implemented by utilizing the first electrodes having lower resistance, the sensor layer for sensing both the touch input and the pen input may be extensively applied to a medium and large-scale electronic device, such as a larger tablet or a larger monitor, as well as a smaller electronic device such as a cellular phone.

Although aspects of some embodiments of the present disclosure have been described for illustrative purposes, those skilled in the art will appreciate that various modifications, and substitutions are possible, without departing from the scope and spirit of the present disclosure as disclosed in the accompanying claims. Accordingly, the technical scope of embodiments according to the present disclosure are not limited to the detailed description of this specification, but should be defined by the claims, and their equivalents.

While aspects of some embodiments of the present disclosure have been described with reference to embodiments thereof, it will be apparent to those of ordinary skill in the art that various changes and modifications may be made thereto without departing from the spirit and scope of the present disclosure as set forth in the following claims, and their equivalents.

What is claimed is:

1. An electronic device comprising:
a display panel including a display layer and a sensor layer on the display layer; and
a sensor driver configured to drive the sensor layer and configured to selectively operate in a first mode for sensing a touch input or a second mode for sensing a pen input,
wherein the sensor layer includes:
a plurality of first electrodes arranged in a first direction and extending in a second direction crossing the first direction;
a plurality of second electrodes arranged in the second direction and extending in the first direction;
a plurality of first trace lines electrically connected to first end portions of the plurality of first electrodes;
a plurality of second trace lines electrically connected to the plurality of second electrodes, respectively; and
a plurality of third trace lines electrically connected to second end portions spaced apart in the second direction from the first end portions of the plurality of first electrodes,
wherein the plurality of third trace lines are configured to be electrically isolated from each other in the first mode, and
wherein the second mode includes a charging driving mode, and at least some of the plurality of third trace lines are configured to be electrically connected to each other in the charging driving mode.

2. The electronic device of claim 1, wherein the sensor driver is configured to apply a first signal to at least one of the plurality of first trace lines, and to apply a second signal to at least a different one of the plurality of first trace lines, in the charging driving mode.

3. The electronic device of claim 2, wherein the second signal has an inverse phase signal of the first signal.

4. The electronic device of claim 1, further comprising:
a plurality of switching transistors, wherein each switching transistor is electrically connected between two third trace lines, which are adjacent to each other, among the plurality of third trace lines.

5. The electronic device of claim 4, wherein a number of the plurality of switching transistors is less than a number of the plurality of third trace lines.

6. The electronic device of claim 4, wherein the plurality of switching transistors are configured to be turned off in the first mode.

7. The electronic device of claim 4, wherein at least a portion of the plurality of switching transistors is configured to be turned on in the charging driving mode.

8. The electronic device of claim 4, further comprising:
a first circuit film electrically connected to one end portion of the display panel;
a second circuit film electrically connected to another end portion of the display panel;
a first circuit board electrically connected to the display panel through the first circuit film; and
a second circuit board electrically connected to the display panel through the second circuit film,
wherein the sensor driver is mounted on the first circuit board, and
wherein the plurality of switching transistors are included in the second circuit board.

9. The electronic device of claim 8, further comprising:
a connection film connected to the first circuit board and the second circuit board, wherein the plurality of switching transistors are configured to operate by the sensor driver.

10. The electronic device of claim 8, further comprising:
an additional sensor driver mounted on the second circuit board,
wherein the additional sensor driver is configured to control an operation of the plurality of switching transistors.

11. The electronic device of claim 4, wherein the plurality of switching transistors are included in the display layer.

12. The electronic device of claim 1, wherein the second mode further includes:
a pen sensing driving mode, and
wherein the sensor driver is configured to receive an induced current from the plurality of first electrodes and the plurality of second electrodes.

13. An electronic device comprising:
a sensor layer; and
a sensor driver configured to drive the sensor layer and configured to selectively operate in a first mode for sensing a touch input or a second mode for sensing a pen input, and including a charging driving mode and a pen sensing driving mode,
wherein the sensor layer includes:
a plurality of first electrodes arranged in a first direction and extending in a second direction crossing the first direction;
a plurality of second electrodes arranged in the second direction and extending in the first direction;
a plurality of first trace lines electrically connected to first end portions of the plurality of first electrodes;
a plurality of second trace lines electrically connected to the plurality of second electrodes, respectively; and
a plurality of switching transistors electrically connected to second end portions spaced apart in the second direction from the first end portions of the plurality of first electrodes, and
wherein the plurality of switching transistors are configured to be turned off in the first mode, and at least some of the plurality of switching transistors are configured to be turned on in the charging driving mode.

14. The electronic device of claim 13, further comprising:
a display layer under the sensor layer,
wherein the plurality of switching transistors are included in the display layer.

15. The electronic device of claim 13, further comprising:
a first circuit film electrically connected to one end portion of the sensor layer;
a second circuit film electrically connected to another end portion of the sensor layer;
a first circuit board electrically connected to the sensor layer through the first circuit film; and
a second circuit board electrically connected to the sensor layer through the second circuit film,
wherein the sensor driver is mounted on the first circuit board, and
wherein the plurality of switching transistors are included in the second circuit board.

16. The electronic device of claim 15, further comprising:
a connection film connected to the first circuit board and the second circuit board,
wherein the sensor driver is configured to control an operation of the plurality of switching transistors.

17. The electronic device of claim 13, wherein the sensor layer further includes:
a plurality of third trace lines electrically connected to the second end portions of the plurality of first electrodes.

18. The electronic device of claim 17, wherein each of the plurality of switching transistors is electrically connected between two third trace lines adjacent to each other among the plurality of third trace lines.

19. The electronic device of claim 17, wherein a number of the plurality of switching transistors is less than a number of the plurality of third trace lines.

20. An electronic device comprising:
a sensor layer; and
a sensor driver configured to drive the sensor layer and configured to selectively operate in a first mode for sensing a touch input or a second mode for sensing a pen input, and including a charging driving mode and a pen sensing driving mode,
wherein the sensor layer includes:
a plurality of first electrodes arranged in a first direction, and extending in a second direction crossing the first direction;
a plurality of second electrodes arranged in the second direction and extending in the first direction;
a plurality of first trace lines electrically connected to first end portions of the plurality of first electrodes; and
a plurality of second trace lines electrically connected to the plurality of second electrodes, respectively,
wherein second end portions spaced apart in the second direction from the first end portions of the plurality of first electrodes are floated in the first mode,
wherein at least some of the second end portions of the plurality of first electrodes are connected to each other to define a current path in the charging driving mode, and
wherein the current path includes:
one first trace line among the plurality of first trace lines, one first electrode connected to the one first trace line among the plurality of first electrodes, another first electrode of the plurality of first electrodes, and another first trace line electrically connected to the another first electrode among the plurality of first trace lines.

* * * * *